US011447598B2

(12) United States Patent
Okkel et al.

(10) Patent No.: US 11,447,598 B2
(45) Date of Patent: Sep. 20, 2022

(54) MULTI COMPONENT DISPERSANT

(71) Applicant: BYK-Chemie GmbH, Wesel (DE)

(72) Inventors: Andreas Okkel, Wesel (DE); Wolfgang Pritschins, Wesel (DE); Matthew Burge, Wesel (DE); Hans-Josef Teuwsen, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 316 days.

(21) Appl. No.: 16/643,254

(22) PCT Filed: Sep. 3, 2018

(86) PCT No.: PCT/EP2018/073565
§ 371 (c)(1),
(2) Date: Feb. 28, 2020

(87) PCT Pub. No.: WO2019/048365
PCT Pub. Date: Mar. 14, 2019

(65) Prior Publication Data
US 2020/0255583 A1 Aug. 13, 2020

(30) Foreign Application Priority Data
Sep. 5, 2017 (EP) ..................................... 17189313

(51) Int. Cl.
| | | |
|---|---|---|
| C08G 18/79 | (2006.01) | |
| C08G 18/10 | (2006.01) | |
| C08G 18/24 | (2006.01) | |
| C08G 18/32 | (2006.01) | |
| C08G 18/42 | (2006.01) | |
| C09D 11/102 | (2014.01) | |
| C09D 175/04 | (2006.01) | |
| C08L 75/14 | (2006.01) | |

(52) U.S. Cl.
CPC ........... *C08G 18/792* (2013.01); *C08G 18/10* (2013.01); *C08G 18/246* (2013.01); *C08G 18/325* (2013.01); *C08G 18/3246* (2013.01); *C08G 18/3271* (2013.01); *C08G 18/3281* (2013.01); *C08G 18/4277* (2013.01); *C08G 18/794* (2013.01); *C08L 75/14* (2013.01); *C09D 11/102* (2013.01); *C09D 175/04* (2013.01)

(58) Field of Classification Search
CPC .... C08G 18/792; C08G 18/10; C08G 18/246; C08G 18/3246; C08G 18/325; C08G 18/3281; C08G 18/4277; C08G 18/794; C08G 18/3271; C08G 75/14; C08G 11/102; C08G 175/04
See application file for complete search history.

(56) References Cited

U.S. PATENT DOCUMENTS

| | | |
|---|---|---|
| 3,817,944 A | 6/1974 | Jones |
| 4,032,698 A | 6/1977 | Ashe |
| 4,070,388 A | 1/1978 | Jones |
| 4,101,529 A | 7/1978 | Ammons |
| 4,762,752 A | 8/1988 | Haubennestel et al. |
| 4,777,195 A | 10/1988 | Hesse et al. |
| 4,795,796 A | 1/1989 | Haubennestel et al. |
| 4,942,213 A | 7/1990 | Haubennestel et al. |
| 5,130,463 A | 7/1992 | Haubennestel et al. |
| 5,143,952 A | 9/1992 | Saheki et al. |
| 6,111,054 A | 8/2000 | Haubennestel et al. |
| 8,795,831 B2 | 8/2014 | Pritschins et al. |
| 9,085,654 B2 | 7/2015 | Pritschins et al. |
| 2014/0194537 A1 | 7/2014 | Gobelt et al. |
| 2016/0200926 A1* | 7/2016 | Shimohara ................. B41J 2/01 347/100 |

FOREIGN PATENT DOCUMENTS

| | | |
|---|---|---|
| EP | 0154678 A1 | 9/1985 |
| EP | 0318999 A2 | 6/1989 |
| EP | 0358555 A2 | 3/1990 |
| EP | 0417490 A2 | 3/1991 |
| EP | 0893155 A2 | 1/1999 |
| EP | 2254926 B1 | 7/2012 |
| EP | 2254927 B1 | 7/2014 |
| JP | 2009086345 A | 4/2009 |
| JP | 2009241063 A | 10/2009 |
| WO | 2002/085507 A2 | 10/2002 |

OTHER PUBLICATIONS

International Search Report and Written Opinion for International Application No. PCT/EP2018/073565 dated Oct. 16, 2018 (9 pages).

* cited by examiner

*Primary Examiner* — Patrick D Niland
(74) *Attorney, Agent, or Firm* — Fitch, Even, Tabin & Flannery, L.L.P.

(57) ABSTRACT

The invention relates to a composition comprising i) 10-90 wt. % of an ethylenically unsaturated component (A), ii) 10-90 wt. % of a component (B) having urethane and/or urea groups, iii) 0-4 wt. % of an organic component (C) which is different from components (A) and (B), and iv) 0-9 wt. % of other ingredients (D) wherein the wt. % are calculated on the total weight of the composition, wherein the sum of the wt. % of component (A) and the wt. % of component (B) is 91-100 wt. %, component (A) consists of compounds having 1-8 ethylenically unsaturated bonds and a molar mass of 100-1400 g/mol, component (A) contains no amino groups, component (B) contains no primary and no secondary amino groups, component (B) consists of compounds having 2-40 functional groups selected from urethane and urea groups, having 1-40 groups selected from tertiary amino groups, salts thereof, quaternary ammonium groups, and mixtures thereof, component (B) contains not more tertiary amino groups than the sum of urethane and urea groups, and component (B) has a nitrogen content in the range of 1.0 to 12.0 wt. %, component (C) consists of organic compounds having a molar mass of less than 1000 g/mol.

21 Claims, No Drawings

MULTI COMPONENT DISPERSANT

The invention relates to a composition, the use of the composition as a dispersant, and to a preparation comprising the composition.

In solution or dispersion in a liquid, wetting agents lower the surface tension or interface tension and in that way increase the wetting capacity of the solution. Dispersants are suitable in general for stabilizing solid particles in binders, paints, coatings, pigment pastes, plastics and plastic blends, adhesives and sealing compounds, for reducing the viscosity of corresponding systems and for improving the flow properties. Dispersion stabilizers are used to stabilize dispersions that have already been produced.

High mechanical forces are necessary in order to be able to disperse solids into liquid media. It is customary to use dispersants to reduce the dispersing forces and to minimize the total energy input into the system, which is required for deflocculation of solid particles and thus also to minimize the dispersing time. In the case of such dispersants, these are surface-active substances having a cationic, anionic and/or neutral structure. In small amounts, these substances are either applied directly to the solid or are added to the dispersing medium. It is also known that, following complete deflocculation of the agglomerated solids into primary particles, after the dispersing operation, there are also instances of reagglomeration, thereby completely or partly nullifying the dispersing effort. As a result of inadequate dispersion and/or reagglomeration, unwanted effects typically occur, such as color drift, an increase in viscosity in liquid systems and a loss of gloss in paints and coatings as well as a reduction in the mechanical strength and material homogeneity in plastics.

Thus, it is important that in general the used wetting and dispersing additive provides good wetting and dispersing abilities. The measurement of gloss values is an established method to evaluate the corresponding dispersing effect in a pigment dispersion. Higher gloss values indicate a better dispersion and stabilization of the pigments.

Often there is also a need for suitable wetting and dispersing additives which provide good results in connection with special applications. The so called flexo printing can be deemed as such a special application. Flexo printing, like letterpress printing, is one of the relief printing processes and is used for printing newspapers, books and packaging, particularly for high-quality food packaging. Color strength/transparency is for the application in flexographic printing inks of great importance. In general different pigmented inks are applied in several layers and inks of low transparency would hide the color of the layers applied before and would have a negative impact on the coloristic quality of the printed image.

In practice, various types of compounds maybe considered for use as wetting agents and dispersants. However, not all of them perform well in connection with the dispersion and the stabilization of pigments and especially not in connection with the flexo printing application.

Good results might be already achieved with polymeric dispersants which are polyisocyanate based addition compounds, as described in EP-A 2 254 926 and in EP-A 2 254 927.

However, also the corresponding performance of these dispersants is improvable.

The object of the present invention was thus to supply a dispersant of general high quality which is especially suitable for the corresponding additive application in the flexo printing field.

The solution to this problem is a composition comprising
i) 10-90 wt. % of an ethylenically unsaturated component (A),
ii) 10-90 wt. % of a component (B) having urethane and/or urea groups,
iii) 0-4 wt. % of an organic component (C) which is different from components (A) and (B), and
iv) 0-9 wt. % of other ingredients (D)
wherein the wt. % are calculated on the total weight of the composition,
wherein the sum of the wt. % of component (A) and the wt. % of component (B) is 91-100 wt. %,
component (A) consists of compounds having 1-8 ethylenically unsaturated bonds and a molar mass of 100-1400 g/mol, component (A) contains no amino groups, component (B) contains no primary and no secondary amino groups, component (B) consists of compounds having 2-40 functional groups selected from urethane and urea groups, having 1-40 groups selected from tertiary amino groups, salts thereof, quaternary ammonium groups, and mixtures thereof, component (B) contains not more tertiary amino groups than the sum of urethane and urea groups, and component (B) has a nitrogen content in the range of 1.0 to 12.0 wt. %, component (C) consists of organic compounds having a molar mass of less than 1000 g/mol.

Each of the components (A), (B) and (C) may consist of different species which all fulfill the corresponding defined requirements of (A), (B) and (C). For example component (A) may be a mixture of different species which all fulfill the above defined requirements of component (A).

The unsaturated component (A) and the urethane/urea component (B) seem to positively interact in connection with providing an improved dispersing effect (kind of synergistic effect): each of the components (A) and (B) might be deemed as to be a kind of co-dispersant and the combination of both forms the improved dispersant. As a result it should be pointed out that the composition according to the invention has a good dispersing effect with regard to a broad spectrum of solids to be dispersed. The composition according to the invention is thus of a particularly high quality and can be used universally as wetting agent and dispersant. In addition, especially in the case of pigment pastes, it is necessary to ensure a broad compatibility, in order to allow these pastes to be used in many different resins, binders, let down systems and coating materials. Furthermore, the compositions according to the invention permit flocculation-free applicability of the pastes, or of binders and coating materials produced with these pastes.

In addition, the composition according to the invention is suitable as dispersion stabilizer, in particular as emulsion stabilizer. The viscosity of the ground material added is definitely reduced during the dispersion as a result of the use of the composition according to the invention, making it possible in this way to prepare formulations having a high solids content. In summary, it can be concluded that the composition according to the invention reduces the viscosity of ground materials of corresponding paints, pastes or plastic formulations while maintaining good stabilization of pigments or fillers to such an extent that processing is possible at high degrees of filling even without having a negative influence on the stability of the cured paints. The beneficial pigment-dispersing and pigment-stabilization properties of the composition according to the invention is e.g. reflected by the corresponding measurement of high gloss values.

The composition according to the present invention is especially suitable as a dispersing additive in the printing ink field. Especially the application in the flexo printing field provides good results e.g. in connection with color strength/transparency and gloss improvement.

In a preferred embodiment the composition according to the invention comprises
I. 25-75 wt. % of component (A),
II. 25-75 wt. % of component (B),
III. 0-2 wt. % of component (C), and
IV. 0-2 wt. % of other ingredients (D)
wherein the sum of the wt. % of component (A) and the wt. % of component (B) is 98-100 wt. %.

In a more preferred embodiment the composition according to the invention comprises
I. 30-70 wt. %, of component (A),
II. 30-70 wt. % of component (B),
III. 0-1 wt. % of component (C), and
IV. 0-1 wt. % of other ingredients (D)
where the sum of the wt. % of component (A) and the wt. % of component (B) is 99-100 wt. %.

Component (A)

Component (A) consists of compounds having ethylenic unsaturation. Ethylenically unsaturated groups are non-aromatic carbon-carbon double bonds. The compounds preferably contain acrylate, methacrylate, allyl- or vinyl-functionality. Often component (A) is a mixture which comprises different species. It may include, for example, α,β-unsaturated carbonyl compounds, such as α,β-unsaturated carboxylic acid esters, α,β-unsaturated carboxylic acid amides, acrylic acid and/or methacrylic acid esters with aliphatic, aromatic and/or aralkylic moieties, ethoxylated and/or propoxylated (meth)-acrylates and hydroxy-functional (meth)acrylates. The number of ethylenically unsaturated groups per molecule is often 1-6, preferably 1-4 and most preferably 2-3. Mixtures of these compounds may be used.

Usually at least 70 wt. % of the unsaturated component (A) is selected from species having 2-4 (not less than 2 and not more than 4), more preferably 2-3 ethylenically unsaturated groups.

Often species (typically at least 70 wt. %) of component (A) have a molar mass of 150-1000 g/mol, more often of 200 to 800 g/mol, for example 300-800 g/mol. Where the species have a molecular weight distribution, the molar mass relates to the number average determined by GPC, using THF as eluent and a polystyrene calibration standard.

Preferably at least 70 wt. % of component (A) is selected from species having (meth)acryl groups.

Generally, at least 70 wt. % of the component (A) is selected from species having a proportion of carbon atoms to ethylenically unsaturated bonds of from 12:1 to 3:1.

Examples of (species of) component (A) are:

Mono-functional acrylates: ethyl acrylate, propyl acrylate, butyl acrylate, isobutyl acrylate, tert-butyl acrylate, isooctyl acrylate, isononyl acrylate, dodecyl acrylate, isodecyl acrylate, tridecyl acrylate, octyldecyl acrylate, ethylene methyl acrylate, 2-ethylhexyl acrylate, 2-propylheptyl acrylate, ethylene butyl acrylate, cyclohexyl acrylate, isobornyl acrylate, allyl acrylate, stearyl acrylate, nonylphenolic acrylate, 2-methoxyethylacrylate, 2-cyanoethyl acrylate, 6-hydroxyhexyl acrylate, 4-pentylphenyl acrylate, 2-hexylphenyl acrylate, 2-phenoxyethyl acrylate, phenoxy diethylene glycol acrylate, phenoxy polyethylene glycol acrylates, ethoxylated-P-cumylphenol acrylates, methoxy-polyethylene glycol monoacrylates, lauryl acrylate, alkoxylated lauryl acrylate, behenyl acrylate, 2(2-ethoxyethoxy)ethyl acrylate, tetrahydrofurfuryl acrylate, 2-phenoxyethyl acrylate, caprolactone acrylate, ethoxylated nonyl phenol acrylates, cyclic trimethylolpropane formal acrylate, dihydrodicylcopenadienyl acrylate, poly glycidyl acrylate, beta-carboxyethyl acrylate, $C_{16}$-$C_{18}$ alkyl acrylates.

Di-functional acrylates: 1,4-butanediol diacrylate, 1,6-hexanediol diacrylate, 1,10-dodecanediol diacrylate, 2-methyl-1,3-propanediol diacrylate, ethoxylated cyclohexane dimethanol diacrylates, propoxylated cyclohexane dimethanol diacrylates ethoxylated tricyclodecane dimethanol diacrylate, propoxylated tricyclodecane dimethanol diacrylate, polyethylene glycol diacrylates, polypropylene glycol diacrylates, triethylene glycol diacrylate, tetraethylene glycol diacrylate, diethylene glycol diacrylate, dipropylene glycol diacrylate, tripropylene glycol diacrylate, ethoxylated 1,6-hexandiol diacrylates, propoxylated 1,6-hexandiol diacrylates, ethoxylated bisphenol A diacrylates, propoxylated bisphenol A diacrylates, propoxylated neopentyl glycol diacrylates, ethoxylated nonyl phenyl diacrylates, propoxylated nonyl phenyl diacrylates, aliphatic urethane triacrylates, aromatic urethane diacrylates.

Poly-functional acrylates: trimethylolpropane triacrylate, ethoxylated trimethylol propane triacrylates, propoxylated trimethylolpropane triacrylates, ethoxylated pentaerythirtol triacrylates, propoxylated pentaerythirtol triacrylates, ethoxylated glycerol triacrylates, propoxylated glyceryl triacrylates, tris-(2-hydroxy-ethyl)isocyanurate triacrylate, pentaerythritol triacrylate, pentaerythritol tetraacrylate, Dipentaerythritol hexacrylate, dipentaerythritol pentaacrylate, ethoxylated pentaerythritol tetraacrylates, propoxylated pentaerythritol tetraacrylates, di-trimethylpropane tetraacrylate, aromatic urethane tetraacrylates, poly-functional polyester acrylates.

Mono-functional methacrylates: methyl methacrylate, n-butyl methacrylate, i-butyl methacrylates, 2-ethylhexyl methacrylate, isodecyl methacrylate, lauryl methacrylate, cetyl methacrylate, stearyl methacrylate, behenyl methacrylate, cyclohexyl methacrylate, allyl methacrylate, benzyl methacrylate, methyltriglycol methacrylate, ethyltriglycol methacrylate, tetrahydro-furfuryl methacrylate, butyl diglycol methacrylate, methoxypropylene glycol methacrylates, ureido methacrylate.

Di-functional methacrylates: neopentyl glycol dimethacrylate, 1,3-butanediol dimethacrylate, 1,4-butanediol dimethacrylate, 1,6-hexanediol dimethacrylate, glycerol dimethacrylate, diurethane dimethacrylate, ethylene glycol dimethacrylate, diethylene glycol dimethacrylate, triethylene glycol dimethacrylate, polyethylene glycol dimethacrylates, bisphenol A dimethacrylate, ethoxylated bisphenol A dimethacrylates, propoxylated bisphenol A diacrylates, glycerine dimethacrylate.

Poly-functional methacrylates: trimethylolpropane trimethacrylate.

Further examples of (species of) component (A) are:

Styrene, substituted styrenes, e.g. methoxystyrene, divinylbenzene, 4-ethylstyrene, 4-methylstyrene, 4-t-butylstyrene or vinyltoluene, N-vinylpyrrolidone, N-vinylcaprolactam, methyl vinyl ketone, ethyl vinyl ketone, vinyl ethers of $C_1$-$C_{20}$ alcohols, 2,3-dihydrofuran, trimethylolpropane diallyl ether monomethacrylate, vinyl(meth)acrylate, allyl vinyl ether, diethyleneglycol divinyl ether, triethyleneglycol divinyl ether, and divinyl ether of $C_1$-$C_{20}$ diols, maleic acid esters, e.g. dibutyl maleate, allyl esters, e.g., diallyl phthalate, vinyl esters of saturated and unsaturated carboxylic acids, e.g. vinyl propionate, vinyl ethylhexanoate, vinyl pivalate, vinyl stearate, vinylureas, limonene, dipentene, indene, allyl benzene, and the like.

In some preferred embodiments, component (A) is free of or essentially free of phosphorus, silicon and halogen. By essentially free of phosphorus, silicon or halogen it is meant that the specified elements are either entirely absent, or the individual elements are present in an amount not exceeding 1.0 wt. %, calculated on the total weight of component (A).

Component (B)

Often component (B) is a mixture which consists of different species.

In a preferred embodiment component (B) has a low content of ethylenically unsaturated groups or is free or essentially free of such groups. The content of ethylenically unsaturated groups can be expressed as Iodine value, which indicates the amount of Iodine in g which is consumed by 100 g of the sample in question. The Iodine value can be determined according to DIN 53241-1:1995-05 using the method of Wijs. It is preferred that component (B) has an Iodine value in the range of 0.0 to 10.0, preferably 0.0 to 5.0.

The application of species of the urethane/urea component (B) which do not contain ethylenically unsaturated carbon-carbon bonds avoids a possible polymerization of said species. Thus, in case of additive application a cross-linking with corresponding binder structures is avoided. This is important because crosslinking of component (B) generally diminishes the stabilization efficiency.

Species of the component (B) normally contain 3-20, preferably 4-10 functional groups selected from urethane and urea groups and species of the component (B) contain normally 1-20, preferably 1-9 tertiary amino groups. In a preferred embodiment of the invention at least 90 mol. % of the species of the urethane/urea component (B) contain 4-15 functional groups selected from urethane and urea groups.

Furthermore, the component (B) normally has a nitrogen content of from 2-10 wt. %, mostly of from 5-9 wt. %. In a preferred embodiment of the invention at least 90 mol. % of the species of the urethane/urea component (B) have a nitrogen content of from 4-9 wt. %. The said nitrogen content is generally measured according to the Dumas principle (ISO 16634-1).

A higher nitrogen content might lead to side effects like product-yellowing or problems in connection with storage stability. However, a lower nitrogen content might lead to lower dispersing effects and/or to a lower stabilization effects.

In a preferred embodiment of the invention the component (B) consists of different species which as a whole have a number-average molar mass $M_n$ 2000-200000 g/mol.

In a preferred embodiment of the invention at least 90 wt. % (often 100 wt. %) of the urethane/urea component (B) consists of adducts which are obtainable by reacting
one or more polyisocyanates (a) having at least two isocyanate groups per molecule with
one or more compounds (b) of the general formula (I)

    Y—(XH)$_n$    (I)

where
XH is a group that is reactive towards isocyanates and
Y is a monomeric or polymeric group that is not reactive towards isocyanates, that contains no tertiary amino groups and no hydrolysable silane groups and that comprises one or more aliphatic, cycloaliphatic and/or aromatic groups, and where the compound of the general formula (I) is possessing a number-average molar mass $M_n$ of 32 to 15 000 g/mol and is not representing a compound which falls within the definition of component (c1) or (c2), and
n is 1, 2 or 3,
where for at least 50 mol. % of the compounds of the general formula (I) it is the case that n is 1, with the proviso that 20% to 90% of the isocyanate groups of component (a) are reacted with the compounds of the general formula (I), and
one or more compounds (c1) of the general formula (IIa)

    Z-Q    (IIa)

in which Q is —NH$_2$, —NHR or OH, in which R is a linear or branched organic group having 1 to 18 carbon atoms, and
Z is an organic group having at least one tertiary amino group and containing no isocyanate-reactive groups, and
optionally one or more compounds (c2) different from (c1) of the general formula (IIb)

    M-Q    (IIb)

in which Q is —NH$_2$, —NHR or OH, in which R is a linear or branched organic group having 1 to 18 carbon atoms, and
M is an organic group having a number-average molar mass of not more than 1000 g/mol, with at least one tertiary amino group and at least one hydroxyl group,
with the proviso that at least 10% (preferably 25%, more preferably 50%) of the isocyanate groups of component (a) are reacted with component (c1).

Component (a)

As component (a) for the preparation of urethane/urea component (B) polyisocyanates having at least two isocyanate groups per molecule are used. Polyisocyanates of this kind are known from the prior art in the present technical field.

The compounds in question are preferably oligomeric or polymeric derivatives of monomeric diisocyanates that contain biuret, urethane, uretdione and/or isocyanurate groups. Monomeric diisocyanates of this kind are, for example, 1,4-diisocyanatobutane, hexamethylene diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diiso-cyanatedecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanato-dicyclohexylmethane, tolylene diisocyanate (TDI), 1-isocyanato-1-methyl-4(3)-isocyanatomethylcyclohexane, bis(isocyanatomethyl)norbornane and 1,3- and 1,4-bis(2-isocyanatoprop-2-yl)benzene (TMXDI) or mixtures of such diisocyanates. Alternatively, the stated monomeric isocyanates may be used as they are, alone or in a mixture, or in a mixture with their oligomeric or polymeric derivatives containing biuret, urethane, uretdione and/or isocyanurate groups. In accordance with the invention it is possible to use one or more monomeric, oligomeric or polymeric polyisocyanates.

The polyisocyanates must possess an average functionality of at least 2. The average functionality is preferably at least 2.5 and more preferably at least 3. Particular preference is given to the above-described derivatives of HDI, TDI and/or IPDI, and especially those of TDI.

Examples of polyisocyanates of this kind are those which are obtainable, for example, by addition of diisocyanates with polyols, such as Desmodur L from Bayer, or those obtainable by biuret reaction from diisocyanates, such as the commercial product Desmodur N from Bayer, or else the polyisocyanates with an isocyanurate parent structure that are obtainable by cyclization of diisocyanates, such as the commercial products Desmodur HL and Desmodur IL from Bayer, the commercial products Polurene KC or Polurene HR from SAPICI, or trimeric isophorone diisocyanate (isocyanurate T1890 from Chemische Werke Hüls). Further examples of polyisocyanates available as commercial products are Desmodur VL (polyisocyanate based on diphenylmethane diisocyanate (MDI), Bayer AG), Desmodur Z4370 (polyisocyanate based on isophorone diisocyanate (IPDI), Bayer AG), Desmodur N3400 (aliphatic HDI uretdione, Bayer AG), Thanecure T9 (aromatic TDI uretdione, TSE Industries), Crelan VP LS 2147 and Crelan VP LS 2347 (aliphatic IPDI uretdiones, Bayer AG), Polurene KD (polyisocyanurate based on tolylene diisocyanate (TDI), SAPICI), Uronal RA 50 (polyisocyanurate based on TDI, from Galstaff), Polurene A (polyisocyanate based on TDI trimethylolpropane (TMP), SAPICI), Polurene MC (polyisocyanate based on TMP-IPDI, SAPICI), Polurene MD 70 (polyisocyanate based on TMP-TDI-MDI, SAPICI). These commercial products are frequently not in the pure form of a polyisocyanate, but instead in the form of mixtures of polyisocyanates of similar structure. As polyisocyanates in the present invention it is preferred to use trimerization products—that is, products containing one or more isocyanurate groups—of diisocyanates based on hexamethylene diisocyanate (HDI), isophorone diisocyanate (IPDI) and/or tolylene diisocyanate (TDI). By the abovementioned "average functionality of at least 2" is meant that in terms of isocyanate groups the commercial products have the stated functionality of at least 2.

"Functionality of 3", for example, means that a molecule contains on average 3 free isocyanate groups. The average functionality can be determined experimentally by determining the number-average molecular weight $M_n$ and the NCO number as described in the example section of the present invention, and calculating therefrom the NCO equivalent weight. The average functionality is the ratio formed from the number-average molecular weight and the NCO equivalent weight. Preferably the average molecular weight of the polyisocyanates is at least 200, more preferably at least 300, very preferably at least 500. Preferably the average functionality is 2.5 to 10, more preferably at least 3, such as 3 to 6, for example.

Component (b)

The polyisocyanates of component (a) are reacted in accordance with the invention with compounds of component (b) of the above formula (I).

The compounds of the formula (I) are characterized in that they contain one, two or three groups XH that are reactive towards isocyanate groups. For the Y group of the compound of the general formula (I), it is the case that it is not reactive towards isocyanates. This means in particular that the group Y is free from the above-mentioned groups XH. Examples of XH are OH, $NH_2$, NHR, SH or COOH, R being a branched or unbranched organic group having 1 to 18 carbon atoms, preferably an alkyl group. Preferably XH is OH, $NH_2$ or NHR. With particular preference these functional groups are hydroxyl groups, since these compounds are readily obtainable and/or available commercially and the resulting reaction products are highly soluble in solvents which are employed in the context of the later use of the additives in accordance with the invention. The groups Y that are not reactive towards isocyanates may contain the heteroatoms O, S, Si and/or N and/or ether, urethane, carbonate, amide and/or ester groups. In the groups Y it is possible for halogen, preferably fluorine and/or chlorine, to be substituted for hydrogen.

As compounds of the formula (I) it is possible to use aliphatic, cycloaliphatic and/or aralphatic compounds. It is also possible to use mixtures of such compounds, in other words, at least two different compounds of the formula (I). The aliphatic or aralphatic compounds of the formula (I) may be straight-chain or branched. They may be saturated or unsaturated. Saturated compounds are preferred, however.

Examples of compounds of the formula (I) are straight-chain or branched alcohols such as methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkylphenols, monophenyl diglycol, alkylnaphthols, phenylethanol and hydroxyethylethyleneurea, and also polyolefin polyols, such as unhydrogenated or hydrogenated, hydroxyfunctional polybutadienes, polypropylenes, ethylene/butylene copolymers or polystyrenes having an average functionality of 1 to 3. Examples of corresponding commercial products are the hydroxy-terminated hydrogenated polybutadienes, available under the name Polytail® from Mitsubishi Chemical, or the hydroxy-terminated ethylene/butylene copolymers Kraton® Liquid L-1203, L-1302 and L-2203 from Kraton Polymers, or the liquid polybutadienes available as NISSO-PB from Nippon Soda Co., or the saturated, long-chain, linear, largely primary alcohols available from Baker Petrolite as Unilin® alcohols, having chain lengths of up to $C_{50}$ and molecular weights of 375 to 700 g/mol, and their ethoxylates, which are obtainable under the Unithox® name. Further examples are described inter alia in EP-A-154 678.

As compounds of the formula (I) it is also possible to use those which contain ester, ether, urethane, carbonate, amide and/or siloxane groups or combinations of these groups. They may therefore, for example, be polyethers, polyesters, polyurethanes, polycarbonates, polysiloxanes or, for example, mixed polyether-polyesters. Polyesters can be prepared for example by reacting dicarboxylic acids and also their esterifiable derivatives such as, for example, anhydrides, acid chlorides or dialkyl esters such as dimethyl esters or diethyl esters by reaction with diols and mono-, di- or tri-functional starter components. The formation of dihydroxy polyesters can be suppressed if required by using correspondingly stoichiometric amounts of monohydroxy compounds, as have been described above. The esterification may be carried out in bulk or else by means of azeotropic esterification in the presence of an entraining agent. Examples of dicarboxylic acids are succinic acid, maleic acid, fumaric acid, glutaric acid, adipic acid, sebacic acid, pimelic acid, phthalic acid or dimerized fatty acids and their isomers and hydrogenation products. Examples of diols are as follows: ethylene glycol, 1,2-propanediol, 1,3-propanediol, 1,4-butanediol, 1,6-hexanediol, neopentyl glycol, cis-1,2-cyclohexanedimethanol, trans-1,2-cyclohexanedimethanol, and also polyglycols based on ethylene glycol or propylene glycol.

Preferred polyesters of the formula (I) are polyesters which can be obtained by poly-condensation of one or more, optionally alkyl-substituted, hydroxy carboxylic acids and/or ring-opening polymerization of the corresponding lactones such as propiolactone, valerolactone or caprolactone, for example, by means of a mono-, di- or tri-hydroxy starter component, as described in EP-A-154 678. Preferably they possess a number-average molecular weight $M_n$ of 150 to 5000 g/mol. As a starter component it is possible in principle to use any compounds other than those given as compounds of the formula (I). The mono-, di- or tri-functional alcohols used as starter components possess preferably 1 to 30, more preferably 4 to 14, carbon atoms. Mentioned by way of example are n-butanol, longer-chain, saturated and unsaturated alcohols, such as propargyl alcohol, oleyl alcohol, linoleyl alcohol, oxo alcohols, cyclohexanol, phenylethanol, neopentyl alcohol, ethylene glycol, propylene glycol and glycerol, and also fluorinated alcohols, hydroxy-functional polydialkylsiloxanes. It is also possible to convert alcohols of the above-described kind and substituted and unsubstituted phenols, by alkoxylation in accordance with known processes, using alkylene oxides such as, for example, ethylene oxide, propylene oxide, butylene oxide and/or styrene oxide, into polyoxyalkylene monoalkyl, polyoxyalkylene monoaryl, polyoxyalkylene monoaralkyl and polyoxyalkylene monocycloalkyl ethers and to use these hydroxy polyethers in the manner described above as starter components for the lactone polymerization. In each case it is also possible to use mixtures of the aforementioned compounds. The lactone polymerization is carried out by known methods, initiated by p-toluenesulphonic acid or dibutyltin dilaurate, for example, at temperatures of about 70° C. to 180° C. Particular preference is given to polyesters based on c-caprolactone, in combination if desired with δ-valerolactone.

As compounds of the formula (I) it is also possible to use mono-, di- or tri-hydroxy poly-ethers. These can be obtained, for example, by alkoxylating the other compounds described as compounds of the formula (I), such as alkanols, cycloalkanols, phenols or the above-described hydroxy polyesters with alkylene oxides such as ethylene oxide, propylene oxide, butylene oxide, styrene oxide or mixtures thereof. Mixed polyethers may be arranged randomly as a gradient or in blocks. These polyethers advantageously have a number-average molecular weight ($M_n$) in the range from about 100 to 10 000, preferably from 150 to 5000 and more preferably from 200 to 3500 g/mol. Preference is given to polyethers based on ethylene oxide, propylene oxide and mixtures thereof. Further preferred are monohydroxy-functional polyoxyalkylene monoalcohols such as polyoxyethylene monoalcohols prepared starting from methanol, such as Pluriol® A 350 E, Pluriol® A 500 E, Pluriol® A 750 E, Pluriol® A 1020 E, Pluriol® A 2000 E or Pluriol® A 5010 E from BASF AG, polyoxypropylene monoalcohols prepared starting from alkanol, such as Polyglycol B01/20, Polyglycol B01/40, Polyglycol B01/80, Polyglycol B01/120 or Polyglycol B01/240 from Clariant AG or Pluriol® A 1350 P or Pluriol® A 2000 P from BASF AG, and polyalkoxylates started using different fatty alcohols and having a variable degree of alkoxylation, of the kind known to the skilled worker under the trade names Lutensol® A, Lutensol® AT, Lutensol® AO, Lutensol® TO, Lutensol® XP, Lutensol® XL, Lutensol® AP and Lutensol® ON from BASF AG. Preference is given to using polyoxyalkylene monoalcohols which contain ethylene oxide and/or propylene oxide and/or butylene oxide groups and which may have been modified with styrene oxide. Particular preference is given to using polyoxyalkylene monoalcohols such as, for example, Polyglycol B 11/50, Polyglycol B 11/70, Polyglycol B 11/100, Polyglycol B 11/150, Polyglycol B 11/300 or Polyglycol B 11/700 from Clariant AG, Pluriol® A 1000 PE, Pluriol® A 1320 PE, or Pluriol® A 2000 PE from BASF AG or Terralox WA 110 from DOW Chemicals, which are polyoxyalkylenes prepared starting from butanol, formed from ethylene oxide and propylene oxide, and with a terminal OH group.

Preferred compounds of the formula (I) are hydroxy-functional polyethers, hydroxy-functional polyesters, hydroxy-functional polyether-polyesters and/or aliphatic and/or cycloaliphatic alcohols having 2 to 30 carbon atoms, some of whose hydrogen atoms may have been replaced by halogen and/or aryl groups.

As compounds of the formula (I) it is also possible to use mono-, di- or tri-functional polysiloxanes such as, for example, amino- or hydroxy-functional polydialkylsiloxanes containing hydroxyl groups not attached to silicon atoms, or to use aminoalkylpolysiloxanes, which where appropriate may have been polyether-modified and/or polyester-modified. In this case the respective amino-functional compounds carry primary or secondary, but not tertiary, amino groups. It is preferred to use hydroxyalkylpolydimethylsiloxanes having number-average molecular weights $M_n$ of 400 to 8000 g/mol, more preferably 400 to 5000 g/mol and very preferably 400 to 2000 g/mol.

As compounds of the formula (I) it is also possible to use polyurethanes, polyether-polyurethanes, polyester-polyurethanes and/or polyether-polyester-polyurethanes, which can be obtained by addition reaction of diisocyanates with dihydroxy compounds in the presence of mono-, di- or tri-functional starter components.

As a diisocyanate for synthesizing the compounds of formula (I) that contain urethane groups it is possible to use the aliphatic, cycloaliphatic and/or aromatic diisocyanates known per se from polyurethane chemistry and having 4 to 15 carbon atoms, such as tetramethylene, hexamethylene, trimethylhexamethylene, dodecamethylene, isophorone, tolylene and diphenyl-methane diisocyanates, methylenebis (4-cyclohexyl isocyanate) or 1,4-cyclohexanebis(methyl isocyanate). As hydroxy compounds for synthesizing the compounds of formula (I) that contain urethane groups it is preferred to use diols having 2 to 12 carbon atoms, polyoxyalkylene glycols and dihydroxy-functional polyesters having preferred number-average molecular weights $M_n$ of not more than 2000 g/mol. As monohydroxy-functional starter component it is possible to use alcohols having up to 30 carbon atoms, such as are described for preparing the polyesters of formula (I), but also the hydroxy polyesters and hydroxy polyethers that are described as a compound of formula (I). The polyesters possess preferably a number-average molecular weight $M_n$ of 300 to 5000 g/mol, and the polyethers from 200 to 2000 g/mol. The Y group can contain carbonate groups such as are obtained by reaction with open-chain and/or cyclic carbonates in accordance with the prior art. Suitability is possessed for example by carbonate-modified linear polyesters or polycarbonate diols such as are used in preparing polyurethane. Examples are described in U.S. Pat. No. 4,101,529, EP 0358 555, or WO 02/085507. Suitable carbonates are, for example, aliphatic, cycloaliphatic, araliphatic and/or aromatic esters of carbonic acid, such as dialkyl carbonates such as dimethyl carbonate, diethyl carbonate or diphenyl carbonate, for example, catechol carbonate or cyclic alkylene carbonates. Particular suitability is possessed by cyclic alkylene carbonates having 5- or 6-membered rings, which if desired may be substituted. Preferred substituents are aliphatic, cycloaliphatic and/or aromatic groups having up to 30 carbon atoms. Examples of suitable cyclic alkylene carbonates are ethylene carbonate, propylene carbonate, glyceryl carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

The group Y may carry further groups which behave inertly during the formation of the component (B), such as, for example the carboxamide group (—NHCO—) or urea groups (—NHCONH—). The fraction of these compounds of the formula (I) that carry such groups should preferably be below 50 mol. %, more preferably below 5 mol. %, based on all of the compounds used of the formula (I). Particularly preferred compounds are those containing none of these groups at all.

The ester, ether, urethane, carbonate and/or siloxane groups that may be present can be in a block structure (preferably poly(ethylene oxide-block-propylene oxide-block-epsilon-caprolactone), form a gradient or else be arranged randomly.

As a compound of the formula (I) it is also possible to use polyacrylic esters and/or polymethacrylic esters having on average up to three NCO-reactive groups, such as are obtained by anionic, cationic or free-radical polymerization of acrylic esters and/or methacrylic esters. Preference is given to monohydroxy-functional compounds.

Monohydroxy-functional polyacrylic esters and polymethacrylic esters are those containing on average one hydroxyl group in the molecule. Such compounds have already been used in the present field of the art for preparing other dispersants. Compounds of this kind are described for example in U.S. Pat. No. 4,032,698 or EP 318 999. Such polyacrylates have preferably a number-average molecular weight $M_n$ of 300 to 20 000 g/mol, more preferably 500 to 10 000 g/mol. They can be arranged in a block structure or else randomly or form a gradient.

The carboxyl group of the monomeric acrylates or methacrylates can be esterified with, for example, aliphatic, cycloaliphatic and/or aromatic alcohols such as methanol, butanol, cyclohexanol, 2-ethylhexanol, lauryl, stearyl, isobornyl or benzyl alcohol or with ether alcohols such as 2-methoxyethanol, 2-phenoxyethanol, tetrahydrofurfuryl alcohol, or glycidol, with polyester alcohols such as hydroxy-functional polycaprolactone, or with alkoxypolyalkylene glycols such as methoxypolyethylene glycol or methoxypolypropylene glycol. The number-average molecular weight $M_n$ of the esterification component is preferably below 2000 g/mol. For preparing the hydroxy-functional polyacrylates or polymethacrylates it is also possible to use mixtures of different monomers described above. For preparing these polyacrylates or polymethacrylates it is also possible as comonomers to use vinyl esters such as vinyl acetate, vinyl ethers such as vinyl ethyl ether, styrene, vinyltoluene and/or vinylcyclohexane. The resulting copolymers have been synthesized from preferably not more than 50 mol. % of comonomers that have no acrylic functionality. Hydroxy-functional poly-2-alkyl-2-oxazolines or poly-2-alkyl-2-oxazines can also serve as a compound of the formula (I). Monohydroxy-functional compounds are used with preference. As the person skilled in the art is aware, poly-2-alkyl-2-oxazolines or poly-2-alkyl-2-oxazines are obtained by cationic, ring-opening polymerization of 2-alkyl-2-oxazolines or 2-alkyl-2-oxazines with initiators such as para-toluenesulphonic acid, methyl tosylate or methyl triflate, for example.

The oxazolinium or oxazinium end groups that result from the living cationic polymerization mechanism can be converted by alkaline hydrolysis via amino ester end groups into the more stable hydroxy amides. An alternative route to the preparation of monohydroxy-functional poly-2-alkyl-2-oxazolines or poly-2-alkyl-2-oxazines is the polymerization with 2-(4-hydroxyphenyl)-N-methyl-2-oxazolinium trifluoro-methanesulphonate as the initiating species (A. Groβ, G. Maier, O, Nuyken, Macromol. Chem. Phys. 197, 2811-2826 (1996)). Through the choice of the alkyl substituent it is possible to control the compatibility. For example, the water-solubility of poly-2-ethyl-2-oxazoline makes it suitable for highly polar systems, whereas poly-2-lauryl-2-oxazoline, for example, is compatible in apolar systems. Where block copolymers are formed from 2-ethyl-2-oxazoline and 2-lauryl-2-oxazoline, the polymers are notable for a particularly broad compatibility. Such poly-2-alkyl-2-oxazolines or poly-2-alkyl-2-oxazines possess preferably a number-average molecular weight $M_n$ of 300 to 20 000 g/mol, more preferably 500 to 10 000 g/mol.

In applications requiring a broad compatibility, as in the universal paste sector, for example, it is frequently advantageous to use uretane/urea components (B) which are prepared with mixtures of different compounds of the formula (I). Where, for example, the inventive compositions are to be used in universal tinting pastes for aqueous and apolar systems, the combination of water-soluble with apolar compounds of the formula (I) is an advantage.

The number-average molecular weight $M_n$ of the compound of the formula (I) is smaller than 15 000 g/mol and is preferably not more than 10 000 g/mol, more preferably not more than 5000 g/mol, very preferably not more than 3500 g/mol, and better still not more than 2000 g/mol. The minimum molecular weight $M_n$ is preferably 100 g/mol, more preferably 150 g/mol, very preferably 200 g/mol, and most preferably 400 g/mol. Preferably less than 50 mol % of the compounds used, according to formula (I), ought to possess a number-average molecular weight of less than 100 g/mol, more preferably less than 25 mol. %, very preferably less than 15.mol % and most preferably 0 mol. %. In the reaction with the monofunctional compounds of the formula (I) 15% to 90%, preferably 20% to 70% and more preferably 25% to 60% of the free NCO groups originally used are reacted.

Examples of di- or trifunctional compounds of the formula (I) are diols and triols and, respectively, diamines and triamines without tertiary amino groups having 2 to 36 carbon atoms, dihydroxydialkyl sulphides and dihydroxy sulphones. Examples are butanediol, hexanediol, cyclohexanedimethanol, neopentyl glycol, ethylene glycol, glycerol, trimethylolpropane, fatty acid dialkanol amides, thiodiglycol di(4-hydroxyphenyl) sulphone, and also hydroxy-functional polybutadienes having an average functionality of 2 to 3. One preferred group of compounds of the formula (I) are polyoxyalkylene glycols advantageously having alkylene groups having 2 to 4, preferably 2, carbon atoms, and preferably having number-average molecular weights $M_n$ in the range from 200 to 2000 g/mol and more preferably 400 to 1500 g/mol. Ethoxylates with 3 hydroxyl groups are obtained, for example, by polymerization using trifunctional alcohols as a starter component. Preferred polyoxyalkylene glycols are polyethylene glycols.

As di- or tri-functional compounds of the formula (I) it is also possible to use those which can be obtained by polymerizing one or more lactones, preferably epsilon-caprolactone, as already mentioned, by means of di- or tri-hydroxy starter components. Preferably these polyesterpolyols have a number-average molecular weight $M_n$ of 500 to 2000 g/mol. A preferred starter component is butanediol or ethylene glycol. Also suitable, however, are the abovementioned diols or triols as suitable starter components. In one preferred embodiment, the polyfunctional compounds of the formula (I) are di- or trifunctional polyethers, polyesters or polyether-polyesters.

As polyfunctional compounds of the formula (I) it is also possible to use polyurethanes, polyether-polyurethanes, polyester-polyurethanes and/or polyether-polyester-polyurethanes, which can be obtained by addition reaction with a diisocyanate with a dihydroxy compound in analogy to the corresponding monofunctional compounds according to formula (I). Preferably these urethane-containing compounds according to formula (I) have an average functionality of not more than 2 and a number-average molecular weight of 300 to 2500 g/mol, preferably of 500 to 1500 g/mol.

The di- or tri-functional compounds of the formula (I) produce crosslinking between the reaction products of polyisocyanate and monofunctional compounds of the formula (I). The starting products can be used for example in amounts such that the di- or trifunctional compounds of the formula (I) constitute the centre of the molecule, and such that attached to them are the polyisocyanates whose remaining isocyanate groups have been or are reacted with monofunctional compounds of the formula (I). It is of course also possible for a certain overcrosslinking or undercrosslinking to be present.

In the case of the reaction with the di- or tri-functional compounds of the formula (I) it is the case that 0% to 45% and preferably 0% to 25% of the NCO groups originally used are reacted. Particularly preferred products are obtained entirely without the use of di- or tri-functional compounds of the formula (I).

In total at least 20%, more preferably at least 25%, and not more than 90%, preferably not more than 80%, more preferably not more than 70%, of the NCO groups of the component (a) that were originally used are reacted with the compounds of the formula (I).

The reaction of the polyisocyanates with different compounds of the formula (I) can be carried out in one single reaction step or in two or more reaction steps in succession. This can take place in any order. In many cases, however, it is advantageous to react the polyisocyanate in succession with the components in the order first of monofunctional and then of polyfunctional compounds. The isocyanate addition can take place, depending on the reactivity of the individual reactants, within the temperature range that is customary for this kind of reaction, from room temperature up to about 150° C. For the purposes of acceleration and reduction of side reactions it is possible to use the customary prior art catalysts such as tertiary amines, for example triethylamine, dimethylcyclohexylamine, N-methylmorpholine, N,N'-dimethylpiperazine, 2-(dimethylaminoethoxy)ethanol, diazabicyclo[2.2.2]octane and similar compounds, and also, in particular, organometallic compounds such as titanic esters, iron compounds such as iron(III) acetylacetonate, for example, tin compounds, such as tin diacetate, tin dioctoate, tin dilaurate or the dialkyl derivatives of tin dialkyl salts of aliphatic carboxylic acids such as dibutyltin diacetate, dibutyltin dilaurate or the like, for example. These catalysts are customarily used in amounts of 0.0001 to 0.1 part by weight per 100 parts by weight of polyisocyanate.

Component (c1)

Component (c1) is represented by the general formula (IIa) as Z-Q. The group Z is an organic group having at least one tertiary amino group that contains no NCO-reactive groups. The group Z is preferably an aliphatic or cycloaliphatic group having at least one tertiary amino group, where appropriate in the form of a tertiary ring nitrogen atom of a heterocyclic ring system. The tertiary amino group, or the heterocyclic ring system with tertiary ring nitrogen, may be attached to the group Q directly or via an organic coupling group. The coupling group via which the tertiary amino group or the heterocyclic ring system with tertiary ring nitrogen may be attached to the group Q comprises preferably 2 to 10, more preferably 2 to 5, carbon atoms. With particular preference it is an alkylene group having 2 to 10, very preferably 2 to 5, carbon atoms, or a polyether group having the same number of carbon atoms. The group Q stands for $NH_2$, OH or NHR, in which R stands for a linear or branched organic group having 1 to 18 carbon atoms, R is often an alkyl group.

One group of compounds which can be used as compounds Z-Q of the formula (IIa) is composed of monohydroxy amines having a tertiary amino group, or aliphatic diamines having a tertiary amino group and a primary or secondary amino group, such as, for example, (N,N-diethylamino)ethanol, (N,N-dimethylamino)ethanol, (N,N-dimethylamino)-propanol, 2-(diethylamino)ethylamine, 3-(dimethylamino)propylamine, 3-(diethylamino)-propylamine, N,N-diethyl-1,4-butanediamine, 1-diethylamino-4-aminopentane, of which 3-(dimethylamino)propylamine and (N,N-diethylamino)ethanol are preferred. Also aliphatic oligoamines having more than one tertiary amine group may be used as for example bis-(3-dimethylaminopropyl)amine or bis-(3-dimethylaminoethyl)amine.

In the case of a further group, Z is a monocyclic or bicyclic heterocyclic group, of which a ring nitrogen atom is attached to the group Q preferably via an alkylene group having 2 to 5 carbon atoms. Preferred heterocycles are triazole, pyrimidine, imidazole, pyridine, morpholine, pyrrolidine, piperazine, piperidine, benzimidazole, benzothiazole and/or triazine and more preferably imidazole and benzimidazole. These heterocycles may contain one or more substituents. They preferably carry one of the following groups: alkyl and/or alkoxy groups having 1 to 6, preferably 1 to 4 carbon atoms (in which case a methoxy group is preferred), or tertiary amino groups.

It is preferred that the heterocyclic groups are attached via a ring nitrogen atom and an alkylene group, preferably with 2 to 5 carbon atoms, to the group Q. The heterocyclic group may of course, besides this ring nitrogen atom, also contain further heteroatoms, including further ring nitrogen atoms.

Further examples of the compounds of the formula (IIa) are N-(3-aminopropyl)imidazole, N-(3-aminopropyl) morpholine, N-(2-aminoethyl)piperidine, 1-methylpiperazine, aminoethylpiperazine. It is characteristic of these compounds that they contain per molecule one group able to react with the NCO groups, and that they additionally possess a nitrogen-containing basic group without reactive hydrogen. These basic groups are characterized in the prior art by their pKa value (cf. U.S. Pat. Nos. 3,817,944; 4,032,698 and 4,070,388). Preference is given to compounds with basic groups having a pKa value of 2 to 14, more preferably of 5 to 14 and very preferably of 5 to 12. The pKa value can be taken from tabular works. The limiting values indicated above refer to the measurement of the pKa value at 25° C. in a 0.01 molar concentration in water. These basic groups likewise endow component (B) with basicity.

Compounds of the formula Z-Q can be obtained, for example, by reacting a (meth)acrylate or epoxide with an amine or nitrogen-containing heterocyclic ring system. Examples of reaction products between a (meth)acrylate and a nitrogen-containing heterocyclic ring system are the reaction products of the hydroxyethyl esters and hydroxypropyl esters of (meth)acrylic acid with the nitrogen-containing heterocyclic ring structure, the following structural elements being attached to the nitrogen of the heterocyclic ring structure:

-propionic acid 2-hydroxyethyl ester, -propionic acid 2-hydroxypropyl ester, -2-methylpropionic acid 2-hydroxyethyl ester and -2-methylpropionic acid 2-hydroxypropyl ester, and ethoxylated and/or propoxylated derivatives thereof. The acrylic esters are preferred.

The reaction with amines proceeds analogously.

Through reaction of an epoxide with an amine or with a nitrogen-containing heterocyclic compound it is likewise possible to prepare the compounds Z-Q. In the course of the reaction, the group Q formed is a secondary hydroxyl group, and a tertiary amino group is formed of the nitrogen atom that takes part in the reaction.

Component (c2)

Compounds M-Q according to formula (IIb) that are used are compounds in which M is an organic group having a number-average molar mass of not more than 1000 g/mol, preferably not more than 500 g/mol and more preferably not more than 300 g/mol, containing at least one tertiary amino group and at least one hydroxyl group, and in which Q is $NH_2$, NHR or OH (where R is a linear or branched organic group having 1 to 18 carbon atoms).

M preferably contains 1 to 10, more preferably 1 to 5 and very preferably 1 to 3, such as for example 2, OH groups. Primary OH groups are preferred.

Examples of M-Q with tertiary amino groups and OH groups are triethanolamine, N-methyldiethanolamine, aminopropylmethylethanolamine, 3-(diethylamino)propane-1,2-diol, tetrakis(2-hydroxypropyl)ethylenediamine, bis(2-hydroxyethyl)dodecylamine and bis(2-hydroxyethyl)octadecylamine.

The compounds of component (c2) can be prepared in analogy to the compounds of component (c1) by reaction of (meth)acrylates or epoxides with amines. Where, for example, glycidol is employed as the epoxide, which already contains a primary hydroxyl group, then, by reaction with a secondary amine, a tertiary amine and a secondary hydroxyl group are formed additionally, and so such adducts carry a primary and a secondary hydroxyl group and also a tertiary amino group.

Nitrogen-containing heterocycles can be reacted analogously with (meth)acrylates and epoxides.

For preparing the addition compounds (species of component (B)), it is also possible to use mixtures of different starting materials such as mixtures of (a) polyisocyanates and/or components (b) and/or components (c1) and/or (c2). Individual representatives of the two or more components (a), (b), (c2) or (c2) may be used in a superstoichiometric or substoichiometric amount. The proportions, however, are preferably chosen such that the isocyanate groups undergo substantially complete reaction; this means that preferably at least 90%, more preferably at least 95%, very preferably at least 98%, and ideally all of the isocyanate groups have undergone reaction.

Modifications

In a further embodiment still present in the urethane group-containing reaction product according to the invention XH-groups, i.e. OH-groups and/or primary and/or secondary amino groups may be reacted further in a subsequent reaction, for example with carboxylic acid anhydrides. The urethane reaction products of the invention are then used as intermediates in the production of modified also according to the invention containing urethane reaction products. The modified products can be used in the same areas as the not modified according to the invention containing urethane reaction products. The modification, for example, the compatibility of the reaction products to certain media may be increased or adjusted.

The tertiary amino groups can also be converted with oxygen, peroxo compounds such as percarboxylic acids and with hydrogen peroxide in the amine oxides, which may additionally be modified with acids such as hydrochloric acid.

Salt Formation

By virtue of the basic groups the addition components (B) are capable of forming salts. For the purposes of the invention, as dispersants, they can also be used in the form of the corresponding salts. In certain cases, by means of such partial or complete salination it is possible to obtain an improvement in activity and/or an enhanced solubility or compatibility or the interactions with solid particles such as pigments and/or fillers are affected. Even in applications where the basicity of the products is a disrupting factor, as for example, in acid-catalysed systems, it is frequently possible to achieve improvements by means of partial or complete neutralization.

The salts are obtained from the resultant reaction product by neutralization with one or more organic or inorganic acids or by quaternization. The amount of acid to be used is guided by the field of use. Depending on each individual case, the acid components may be used in equimolar, substoichiometric or super-stoichiometric amounts. From polycarboxylic acids, for example, it is also possible to use up to one equivalent of polycarboxylic acid per basic group to be neutralized in order to give the products an acidic character. It is preferred to carry out approximately equi-molar neutralization. Preference is given to salts with organic carboxylic acids or acidic phosphoric esters. Examples of such acidic phosphoric esters are given in EP 893 155, EP 417 490 and U.S. Pat. No. 5,143,952. Examples of carboxylic acids are aliphatic and/or aromatic carboxylic acids such as short-chain or long-chain fatty acids, formic acid, acetic acid, neodecanoic acid, oleic acid, tall oil fatty acid, stearic acid, ricinoleic acid, natural saturated or unsaturated plant or animal fatty acids and their maleic anhydride adducts, maleic acid, fumaric acid, succinic acid, dodecenylsuccinic acid, 5-norbornene-2,3-dicarboxylic acid, adipic acid, glutaric acid, benzoic acid, nitrobenzoic acid, phthalic acid, tetrahydrophthalic acid, isophthalic acid, terephthalic acid, dimerized or trimerized fatty acids, citric acid and abietic acid.

Quaternization

The urethane reaction products of the invention preferably contain tertiary amino groups. These can be converted completely or partially by reaction with quaternization-reagents to provide the corresponding quaternary ammonium salts. The quaternized products can be used in the same areas as the non-quaternized urethane group-containing reaction products according to the invention. By quaternization the compatibility of the reaction products to certain media can be increased or adjusted or the interaction with solid particles such as pigments and/or fillers are affected.

Suitable quaternization-reagents can be selected for example from the group of alkyl halides, aryl halides, alkyl/aryl halides, alkyl and/or aryl derivatives containing leaving groups such as triflate, mesylate or tosylate.

Examples of suitable quaternization-reagents are benzyl chloride, 2- or 4-vinyl benzyl chloride, methyl chloride, methyl iodide, or dimethyl sulfate, methyltosylate. Preferred is benzyl chloride.

A further possibility for quaternization is the use of oxiranes such as glycidyl ethers in the presence of acids. Examples of suitable glycidylether are alkyl glycidylethers such as 2-ethylhexyl, and $C_{13}/C_{15}$ glycidyl ether (trade name as Grilonit RV 1814) or aryl glycidyl ethers. Suitable for these quaternization acids are for example carboxylic acids such as benzoic acid, acetic acid or lactic acid. Other acids can include acidic phosphoric acid esters having one or two ester groups.

The process of the invention is preferably carried out such that first of all, the compounds of component (a) are reacted with those of component (b) and only then are the remaining isocyanate groups reacted with the compounds of component (c1) and/or (c2). The components (a), (b), (c1) and (c2) that are used in the process of the invention correspond to those already described earlier on above.

Normally it is fulfilled for at least 70 wt. % of the components (B) that Z has one or more of the following definitions: j) an aliphatic and/or cycloaliphatic group having at least one tertiary amino group, or k) a heterocyclic group having at least one basic ring nitrogen atom that does not contain a hydrogen atom, it being possible for the heterocyclic group to be attached to the group Q via an organic coupling group.

Often it is fulfilled for at least 70 wt. % of the adducts (B) that the mono-functional species of the formula (I) are selected from monohydroxy-functional polyethers, polyesters, polyether-polyesters and/or aliphatic and/or cycloaliphatic monoalcohols having 2 to 30 carbon atoms.

Typically it is fulfilled for at least 70 wt. % of the adducts (B) that the polyisocyanates (a) are products containing one or more isocyanurate groups, of diisocyanates based on hexamethylene diisocyanate, diisophorone diisocyanate and/or tolylene diisocyanate.

In case polyisocyanate mixtures are used which have on average at least 2.5 free isocyanate groups per species, also branched, i.e. non-linear, polyurethane structures are formed. Accordingly, non-linear addition compounds are particularly preferred in accordance with the invention.

Solvents

The preparation of component (B) can be carried out, depending on the viscosity, in bulk or in the presence of suitable solvents, solvent mixtures or other suitable liquid media. Suitable solvents or liquid media are all those which are not reactive under the chosen reaction conditions or whose reactivity towards the co-reactants is negligible and in which the reactants and the reaction products are at least partly soluble. The polyisocyanates that are used as component (a) in many cases contain solvents like ethyl acetate or butyl acetate to facilitate their handling. These may be used for the reaction or be removed in advance. Other examples for suitable solvents are hydrocarbons such as toluene, xylene, aliphatic and/or cycloaliphatic benzine fractions, chlorinated hydrocarbons such as chloroform, trichloroethane, cyclic and acyclic ethers such as dioxane, tetrahydrofuran, polyalkylene glycol dialkyl ethers such as dipropylene glycol dimethyl ether, esters of monocarboxylic, dicarboxylic or polycarboxylic acids, such as ethyl acetate, propyl acetate, isobutyl acetate, butyl acetate, butyrolactone, dimethyl 2-methylglutarate, triacetin, phthalates or other plasticizers, di- or polycarboxylic esters, dialkyl esters of $C_2$ to $C_4$ dicarboxylic acids, referred to as "Dibasic Esters", alkyl glycol esters such as ethyl glycol acetate, methoxypropyl acetate, ketones such as methyl isobutyl ketone, cyclohexanone, acetone, acid amides such as dimethylformamide, N-methylpyrrolidone, and the like. The solvent or solvents and/or liquid media are advantageously selected to take account of the planned field of use. Where the products are to be used, for example, in applications where the presence of VOCs (volatile organic compounds) is unwanted, the formulation should as far as possible be solvent-free or in appropriately high-boiling liquid media.

The final composition (according to the invention) preferably has a low solvent content (preferably free of solvents). Thus, the removal of used solvents is an important measurement.

The solvent can be removed, for example, by distillation, where appropriate under reduced pressure, and/or azeotropically with the addition of water, such removal being complete or partial. Alternatively the active substance can be isolated by precipitation, by the addition of non-solvents such as aliphatic hydrocarbons, hexane for example, subsequent separation by filtration, and drying if desired. The active substance obtained by one of these methods can then mixed with a component (A) suitable for the particular field of application. If desired, following the addition of suitable high-boiling solvents, the solvent in which the addition product is dissolved can be distilled off, where appropriate under reduced pressure, and/or azeotropically with addition of water, and in this way the addition product can be transferred to a carrier medium that is suitable for the respective field of application.

Component (A) may be added after the preparation of component (B) to component (B), preferably before removal of low boiling solvents. When no ingredients like primary or secondary amines, that might react with component (A), are involved, component (A) can be used advantageously as reaction medium for the preparation of component (B). In this case, solvents, that are contained in the polyisocyanate component (a), may be removed after mixing of component (A) with the polyisocyanate, before the addition reaction is started.

Catalysts

The reactions can be carried out in the presence of customary catalysts, typically based on amines and/or metal compounds containing for example tin, zinc, bismuth, zirconium or aluminum. Examples being organotin compounds, such as dibutyltin dilaurate, other organometallic compounds such as bismuth carboxylate, zinc carboxylate, tertiary amines such as triethylenediamine, enzymes or the like.

By varying the substituents of the formula (I) in terms of the nature, proportions and/or molecular weights thereof, it is possible to adapt the properties of component (B) to the different fields of application. For example, the solubility and compatibility can be brought into line with a very wide variety of solvents, carrier media, binders, resins, solids and, where appropriate, further polymeric compounds that are present in coating and molding materials in which the compositions according to the invention are employed.

For use in highly polar systems, the groups Y ought to include a sufficiently high fraction of polar groups, such as polyethylene oxides, for example, in order to achieve a level of solubility which is sufficient for the particular area of use. This fraction of hydrophilic groups ought also not be too high, however, if in certain applications this results in an unwanted increase in the sensitivity to water. In one important embodiment the groups Y of the XH-functionalized polyalkylene oxides are groups which endow the compounds Y—XH and also, ultimately, compositions of the invention essentially with insolubility in water. Such groups Y of the XH-functionalized polyalkylene oxides advantageously contain up to a maximum of 28% by weight, preferably up to a maximum of 20% by weight, more preferably up to a maximum of 10% by weight and very preferably up to a maximum of 5% by weight of ethylene oxide units, based on the total amount of alkylene oxide units in the group Y.

In the case of use in apolar systems such as long-oil alkyd paints, PVC plastisols or polyolefins there should preferably be an appropriate fraction of apolar groups, and in the case of use in systems where broad compatibility is important, such as pigment concentrates, for example, a balanced combination of polar and apolar groups is of advantage.

If the compositions of the invention are used, for example, in a polyurethane resin or in a coating material whose binder is a polyurethane it is advantageous to use those addition compounds of the invention whose molecule, by virtue of the groups present in the starting compounds of the formulae (I), also includes urethane groups or similar groups which, as is known to the skilled person, are compatible with polyurethanes. The same applies, mutatis mutandis, to, for example, polyacrylates, polyesters, alkyd resins, and other polymers.

Mutatis mutandis this also applies to the substituents of components (c1) and (c2), which are of particular influence on the affinity of component (B) for the solids to be dispersed. Compositions of the invention with surface-active substituents may modify the surface tension of the substrates produced using them. If, for instance, very apolar groups such as long-chain alkyl groups having more than 12 carbon atoms, polydimethylsiloxane-containing and/or perfluoroalkyl-containing groups are present, for example, the products are suitable for reducing the surface tension of liquid systems, and for influencing the associated properties such as, for example, wetting properties, stainability, printability, flow and foam behavior.

Component (C)

Component (C) is an optional ingredient and consists of organic compounds having a molar mass of less than 1000 g/mol.

Non-limiting examples of component are polymerization inhibitors to improve the storage stability of the composition. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Suitable commercial inhibitors are, for example,4-methoxyphenol, 2,6-Ditert-butyl-4-methylphenol, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

Preferred polymerization inhibitors are 4-methoxyphenol and Genorad™ 16 from Rahn AG.

Preferred inventive compositions contain 0.000-1.500% parts by weight, more preferably 0.000-1.000% and most preferably 0.001-0.500% of polymerization inhibitor.

Other Ingredients (D)

The inventive compositions may contain 0.0-9.0 wt. % of other ingredients, which are not covered by the definitions of component (A), (B) or (C). Examples for (D) are residual unreacted raw materials, processing aids, catalysts, stabilizers, defoamers or solvents.

In a preferred embodiment of the invention the composition of the present invention is a liquid preparation at ambient temperature, for example at 23° C.

Preferably, the composition according to the present invention has an amine value of 2-50, more preferably of 5-40 and most preferably of 10-20 mg KOH/g.

With lower or higher amine values, the efficiency of the compositions regarding stabilization of the solid particles is diminished. Higher amine values in many cases lead to poorer solubility and compatibility with the application matrix and increase the susceptibility to unwanted side effects like yellowing or reduced storage stability.

Normally, the composition according to the present invention contain no primary and no secondary amines. This avoids unwanted reactions, like crosslinking of the additive in the application mixture.

In a preferred embodiment the composition contains no free radical initiators. Free radical initiators are substances that can produce radical species under mild conditions and promote radical reactions. Typical examples are azo compounds and organic and inorganic peroxides.

The present invention relates also to the use of a composition according to the present invention as a dispersant, in particular as a dispersant for solid particles.

Furthermore, the present invention relates to the use of a composition according to the present invention in the preparation or processing of paints, coatings, inks, including printing inks, paper coatings, leather and textile colors, pastes, pigment concentrates, ceramics, cosmetic preparations, casting compositions and/or molding compositions based on synthetic, semi-synthetic or natural macromolecular substances.

The present invention is also about an application preparation containing a composition according to the present invention and the application preparation being a coating, an ink or a polymer resin, wherein the preparation contains solid particles.

The composition according to the invention is preferably suitable as a wetting agent and dispersing agent, especially for coatings and plastics applications. Furthermore, the composition according to the present invention can be used as an additive, preferably, in coatings, especially in lacquers, in paints, in plastics, in pigment pastes, in sealants, in cosmetics, in ceramics, in adhesives, in casting compounds, in pigment-containing compounds of flat-screen technology, in filling compounds, in printing inks and in inks, preferably in lacquers.

In this application, the composition is preferably used as a wetting and dispersing agent.

Finally, it is possible to provide a paint and/or plastic containing the composition of the present invention.

The compositions according to the invention are used, for example, as aluminum passivators, dispersants, dispersion stabilizers or wetting agents and can be used, for example, in pigmented and/or filler-containing products, for example, pigment concentrates or pastes, coating compositions, sealants, plastics, ceramics, cosmetics, adhesives, casting compounds, spackling compounds, inks and/or printing inks. Preferred pigment concentrates are those, which can be mixed with appropriate paint systems, thereby producing pigmented paints.

The aforementioned compositions may thus be used, for example, in the production or processing of paints, coatings, inks and printing colors, for example, for ink jet printing, paper coatings, leather and textile inks, pastes, pigment concentrates, ceramics, adhesives and sealants, casting compounds, plastics and cosmetic preparations, in particular when these contain solids, such as pigments and/or fillers (also fibrous). The aforementioned compositions may also be used in the production or processing of molding compounds based on synthetic, semisynthetic or natural macromolecular substances, such as polyvinyl chloride, saturated or unsaturated polyesters, polyurethanes, polystyrenes, polyacrylates, polyamides, epoxy resins, polyolefins, for example, polyethylene or polypropylene. The compositions also may be used to produce, for example, casting compounds, potting materials, PVC plastisols, gel coats, polymer concrete, circuit boards, industrial paints, wood and furniture paints, automotive paints and enamels, (antifouling) marine paints, anticorrosion paints, can and coil coatings or painter and architectural paints.

The compositions according to the invention may be used not only in paint systems for pigmented paints but use in a wide range of formulations and/or products, such as resins, oils, greases, lubricants, rubbers, sealants, printing colors, inks, adhesives, waxes or coating compositions is also possible. The compositions may also be used in formulations, which are prepared in the personal care industry or in electrical applications in the electronics industry, in the shipbuilding industry, within the context of medical applications, in the construction industry or in the automotive industry. Examples include electronic paper, such as the display in e-books, encapsulation of microelectronic chips and circuit boards, underwater hull coatings, such as antifouling coatings, silicone tubes or lubricant additives for brake components.

The compositions according to the invention may advantageously also be used in the production of color filters for liquid crystal displays, liquid crystal screens, color resolution devices, sensors, plasma display screens, displays based on SED (surface conduction electron emitter display) and for MLCC (multilayer ceramic compounds). The MLCC technology is used in the production of microchips, multi layer ceramic capacitors and circuit boards.

Other fields of application worth mentioning include NIP (non-impact printing), inkjet (on paper, foil, ceramic, artificial and natural fiber fabrics), dispersing ceramic (aqueous or anhydrous), dispersing in potting materials. The compositions according to the invention can also be used as such, i.e., without having been previously incorporated into a corresponding concentrate, in the formulations and fields of applications mentioned above.

Typically, the product containing the composition, as well as pigments and/or fillers, is a paint, or a pigment concentrate for coating compositions. Ultimately, however, the use of said compositions is possible in any pigment-containing and/or filler-containing products.

The pigment concentrates are in particular compositions that contain, for example, water and/or organic solvents and at least one pigment in addition to the composition according to the invention. These pigment concentrates in particular may contain additionally fillers and organic polymers as binders. Typically pigment concentrates contain no or only small portions of organic polymers as a binder. Such known binders are advantageously present in the corresponding final paint systems and are described below.

Suitable organic solvents are in particular those typically used in the field of paint and dye industry and which are known to those skilled in the art, such as aliphatic solvents, cycloaliphatic solvents, aromatic solvents, such as toluene, xylene, solvent naphtha, ethers, esters and/or ketones, for example, butyl glycol, butyl diglycol, butyl acetate, methyl isobutyl ketone, methyl ethyl ketone and/or solvents such as methoxypropyl acetate, diacetone alcohol.

The pigments used may be the pigments known to those skilled in the art. Examples of suitable pigments include mono-, di-, tri- and polyazo pigments, oxazine, dioxazine, thiazine pigments, diketo pyrrolopyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone, perylene pigments and other polycyclic carbonyl pigments, carbon black pigments and/or pigments based on carbon black, such as graphite. Further examples of organic pigments can be found in the monograph: W. Herbst, K. Hunger "*Industrial Organic Pigments*", 1997 (Verlag: Wiley-VCH, ISBN: 3-527-28836-8). The pigments used may be inorganic pigments, such as zinc, titanium dioxide, zinc oxide, zinc sulfide, zinc phosphate, barium sulfate, lithophones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow or chromium titanium yellow), Further examples can be found in the monograph: G. Buxbaum "*Industrial Inorganic Pigments*", 1998 (Verlag: Wiley-VCH, ISBN: 3-527-28878-3). Inorganic pigments can be magnetic pigments based on pure iron, iron oxides and chromium oxides or mixed oxides, metallic effect pigments of aluminum, zinc, copper or brass as well as pearlescent pigments or fluorescent and phosphorescent pigments. Other examples include nanoscale organic or inorganic solids with particle sizes of less than 100 nm in at least one dimension, such as certain types of carbon black or other allotropic forms of carbon, such as single-wall CNTs, multiwall CNTs and graphene. The particle size is determined, for example, by means of transmission electron microscopy, analytical ultracentrifugation or light scattering methods. Particles consisting of a metal oxide and/or hydroxide or a semimetal oxide and/or hydroxide as well as particles consisting of mixed metal oxides and/or hydroxides and/or semimetal oxides and/or hydroxides may also be mentioned. For example, the oxides and/or oxide hydroxides of aluminum, silicon, zinc, titanium, etc. may be used for the production of such extremely finely divided solids. The process for producing these oxidic and/or hydroxidic and/or oxide hydroxidic particles may involve a variety of methods, such as, for example, ion exchange processes, plasma processes, sol-gel methods, precipitation, comminution (e.g. by grinding) or flame hydrolysis. All the pigments mentioned above may also be present in a surface-modified form and may have basic, acidic or neutral groups at the surface.

Where the respective products, especially the coating compositions, contain fillers, the fillers are, for example, fillers known to the person skilled in the art. Examples of powdery or fibrous fillers are, for example, those which are composed of powdery or fibrous particles of alumina, aluminum hydroxide, silica, diatomaceous earth, siliceous earth, quartz, silica gel, talc, kaolin, mica, perlite, feldspar, slate flour, calcium sulfate, barium sulfate, calcium carbonate, calcite, dolomite, glass or carbon. The fibers used may be organic and/or inorganic in nature and may also be used as reinforcement materials. Other examples of pigments or fillers may be found, for example, in the U.S. Pat. No. 4,795,796 A. Provided that the compositions according to the invention are not already used in the usual amounts of additives for this purpose, flame retardants also, such as aluminum or magnesium hydroxide and matting agents such as silicas can also be dispersed and stabilized particularly well by the wetting agents and dispersants according to the invention.

The compositions according to the invention are also particularly suitable for the production of solid concentrates, such as pigment concentrates. For this purpose the compositions according to the invention are presented in a carrier medium such as organic solvents, plasticizers and/or water, and the solids to be dispersed are added with stirring. In addition, these concentrates may contain binders and/or other excipients. Using the compositions according to the invention, it is possible, in particular, to produce stable binder-free pigment concentrates. Using the compositions according to the invention it is also possible to produce flowable solid concentrates from pigment press cakes. For this purpose, the composition according to the invention is mixed with the press cake, which can still contain organic solvents, plasticizers and/or water, and the mixture thus obtained is dispersed. The solid concentrates produced by different routes can then be incorporated in different substrates such as, for example, alkyd resins, polyester resins, acrylate resins, polyurethane resins or epoxy resins. Pigments can also be dispersed without solvent directly in the compositions according to the invention and are particularly suitable for pigmenting thermoplastic and thermosetting plastics formulations.

Depending on the field of application, the compositions according to the invention are used in amounts such that the product ultimately interesting for further application contains a proportion of the wetting agent and dispersant according to the invention advantageously from 0.01 to 10% by weight, based on the total amount of the respective product. However, even larger amounts are also possible. Based on the solid to be dispersed, for example, the pigment, the composition according to the invention is used in an amount of preferably 0.5-100% by weight.

When using solids that are difficult to stabilize, the amount of wetting agent and dispersant according to the invention may be much higher. The concentration of dispersant needed depends in general on the specific surface area of the solid to be dispersed. Thus, for example, it may be important to know which pigment is involved. Generally, it can be stated that the stabilization of inorganic pigments generally requires less dispersant than is required for stabilizing organic pigments, as the latter tend to have a higher specific surface and therefore require a larger amount of dispersant. Typical doses of the wetting agent and dispersant for inorganic pigments are 1 to 30 wt. %, for organic pigments 10 to 50 wt. %, each based on the solid to be dispersed, in particular the pigment. In case of very finely divided pigments, for example, some carbon blacks, added amounts of 30 to 90% or more are needed. The criteria for sufficient pigment stabilization can include, for example, gloss and transparency of the coating compositions, or the degree of floating. The dispersion of the solids can take place as grinding a single solid or as grinding a mixture of multiple pigments simultaneously, with the best results usually being achieved with grinding a single solid. Using mixtures of different solids may increasingly result in agglomerations in the liquid phase due to opposing charges on the surface of the solids. In these cases a uniform, usually positive, charge of all the particles can be achieved when using the compositions according to the invention, and therefore instabilities due to differences in charge can be prevented. The dispersants achieve their optimal effect when added to the ground material, especially when first the solid to be dispersed is only mixed with the additive and optionally solvents ("premix"), since then, the additive can preferentially adsorb to the solid surface, without having to compete with the binder polymers. In practice, however, this procedure is only necessary in exceptional cases. If necessary, the compositions according to the invention may also be used later (as so-called "post-additives") to solve floating or flocculation issues in an already finalized batch, for example. In this case, however, usually higher additive doses are required. The products, in particular the coating compositions and/or paints, in which the compositions according to the invention should ultimately manifest their effects, may also contain an organic polymer as a binder. Those skilled in the art are familiar with such binders. Said at least one binder may be introduced, for example, by means of a paint system, which is mixed, for example, with a pigment concentrate containing the composition according to the invention, so that the product in question is a pigmented paint. However, other pigmented and/or filler-containing products based on an organic polymer matrix are also possible, for example, plastics, sealants and other products known to the person skilled in the art. A product may be regarded as a system containing a polymer resin and/or an organic polymer as binder, so the product is capable of forming a solid organic polymer matrix (for example, a coating composition) under suitable curing conditions. Also referred to as product is a system that by simple mixing with a component which contains a binder can form such organic polymeric matrix (for example, a pigment concentrate). For example, but not limited to, alkyd resins, polyester resins, acrylate resins, polyurethane resins, cellulose nitrates, cellulose acetobutyrates, melamines, chlorinated rubbers and/or epoxy resins, known to the person skilled in the art, may also be used. Examples of water-based coatings include cathodic or anodic electrodeposition paints, for example, for automobile bodies. Other examples include plasters, silicate paints, emulsion paints, water-based paints based on water-dilutable alkyds, alkyd emulsions, hybrid systems, two-component systems, polyurethane and acrylate dispersions. Both one-component systems and two-component systems are possible, wherein in the latter case, in general, also polyisocyanates, melamine resins and/or polyamide resins are present in the second component as the typical crosslinking agents known to the person skilled in the art. Product systems, in particular coating compositions, that contain an acrylate resin as binder are preferred.

Another variant is a two-component (2C) coating composition and/or a two-component (2C) paint, which contains an epoxy resin in the binder component and an amine functional resin in the crosslinking component. The coating compositions that are preferred as the products may be water-based or solvent-based. Water-based is to be understood that the coating composition contains mainly water as a solvent. A water-based coating composition in particular will contain not more than 10 wt. % organic solvent, based on the total amount of solvent present in the coating composition. A coating composition containing not more than 5 wt. %, preferably not more than 2 wt. % of water, based on the total amount of solvents, is considered to be solvent-based.

For example, photoinitiators, defoamers, wetting agents, film-forming additives, such as cellulose derivatives (for example, cellulose nitrates, cellulose acetates, cellulose acetobutyrate), reactive diluents, flow control agents, dispersants and/or rheology-controlling additives may be used as additional product components, for example.

The pigment concentrates and coating composition preferred as products according to the invention are produced by methods known to the person skilled in the art. The known methods are used, such as, for example, stepwise addition, while stirring and mixing the components of the coating composition in conventional mixing equipment, such as stirred vessels or dissolvers.

Coatings and/or paint layers can be produced by using the preferred pigment concentrates and coatings compositions. The coating is performed by using the application techniques known to the person skilled in the art applying the coating to a substrate and subsequent curing.

The application is carried out, for example, by the known spraying, squirting, brushing, rolling, casting, impregnating, soaking and/or dipping methods. After application of the coating composition onto a substrate, the curing or drying is carried out by conventional methods. For example, the applied coating composition may be curable by physically drying, thermally and/or by applying actinic radiation (radiation-curing), preferably UV radiation, and electron beams, for example. Thermal curing can take place for example in the range of about 10° C. to about 400° C., depending on the type of coating composition and/or the substrate. In each individual case, the duration of the curing depends, for example, on the type of curing method (thermal or actinic), the type of coating composition used and/or the substrates. For this purpose, the substrate may be in motion or at rest.

In addition to the application above described as dispersants and/or coating agents for powdery and fibrous solids, the compositions according to the invention may also be used as viscosity reducers and compatibilizers in synthetic resins. Examples of such synthetic resins include the so-called "sheet molding compounds" (SMC) and "bulk molding compounds" (BMC), which consist of unsaturated polyester resins having a high filler and fiber content. Their production and processing is exemplified in U.S. Pat. No. 4,777,195 A. An issue in SMC and BMC resin mixtures is often the addition of polystyrene (PS) to the formulation in order to reduce the shrinkage during processing. PS is not compatible with the unsaturated polyester resins used and thus resulting in the separation of the components. When using PS-filled SMC or BMC mixtures, the compositions according to the invention may, due to their good dispersing qualities, lead to a compatibilization effect between PS and unsaturated polyester resin, which increases the storage stability and process reliability of such mixtures.

Phase transfer effects can be achieved by means of the compositions according to the invention, for example, in incompatible polyol mixtures, polyol-isocyanate mixtures or polyol-propellant mixtures (such as are used in the production of polyurethane).

The invention will be explained below in more detail, using examples. Unless otherwise remarked, parts are parts by weight and percentages are percentages by weight.

Measurement Methods:

In the case of substances without molecular uniformity the stated molecular weights (molar mass)—below as already in the foregoing description—represent average values of the numerical mean. The molar mass or number-average molecular weights $M_n$, are determined, when titratable hydroxyl or amino groups are present, by end-group determination via the determination of the OH number or amine number, respectively. In the case of compounds to which an end-group determination cannot be applied, the molar mass or number-average molecular weights (Mr) is determined by means of gel permeation chromatography against a polystyrene standard.

Applied Gel Permeation Chromatography (GPC)

The gel permeation chromatography was carried out at 40° C. with a high-pressure liquid chromatography pump (Bischoff HPLC 2200) and a refractive index detector (Waters 419). The eluent used was tetrahydrofuran, with an elution rate of 1 ml/min. The calibration was performed using polystyrene standards.

Measurement of Non-Volatile Content (Solids Content)

The sample (2.0±0.2 g of the tested substance) was weighed accurately into a previously dried aluminum dish and dried for 20 minutes at 150° C. in the varnish drying cabinet, cooled in a desiccator and then reweighed. The residue corresponds to the solids content in the sample (ISO 3251).

Measurement of Hydroxyl Numbers

Determination of the hydroxyl numbers was done according to DIN ISO 4629. The alcoholic hydroxyl groups were reacted by acetylation with an excess of acetic anhydride. The excess acetic anhydride was hydrolyzed to acetic acid by adding water and titrated back using ethanolic KOH solution. The hydroxyl number is understood to be the KOH quantity in mg, which is equivalent to the acetic acid quantity bound when acetylating 1 g of substance.

Measurement of Amine Numbers

The amine number is the amount KOH in mg which corresponds to the amine content of 1 g of substance. The amine number is determined according to DIN 16945 by potentiometric titration with 0.1 N perchloric acid in acetic acid.

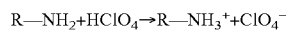

$$R-NH_2 + HClO_4 \rightarrow R-NH_3^+ + ClO_4^-$$

NCO Content

The free NCO content of the polyisocyanates employed and also the course of the NCO addition reactions, are determined in accordance with EN ISO 9369 by reaction with dibutylamine and subsequent titration of the amine excess. These methods are also described in Saul Patai's "The Chemistry of Cyanates and their Thio Derivatives", Part 1, Chapter 5, 1977.

Iodine Value

The amount of unsaturation is determined by the iodine value according to DIN 53241-1:1995-05 using the method of Wijs. The sample is dissolved in carbon tetrachloride and reacted 30 minutes at 25° C. with an excess of iodine monochloride solution (Wijs reagent). Unreacted halogens are determined by back titrating with 0.1 N sodium thiosulfate solution. The iodine number is defined as the grams of halogen, expressed as iodine, reacting with 100 g of substance Nitrogen Content The Nitrogen content is determined by the Dumas method according to ISO 16634-1.

Abbreviations:

SR 9020=3-mole propoxylated glyceryl triacrylate, purchased from Sartomer

Genorad 16=polymerization inhibitor in acrylic acid ester, purchased from Rahn A G MEHQ=4-Methoxyphenol MPEG 350=polyethylene glycol monomethyl ether, average molecular weight Mn=350

MPEG 500=polyethylene glycol monomethyl ether, average molecular weight Mn=500

PEG 400=polyethylene glycol (dihydroxy-functional), average molecular weight Mn=400

Preparation of Monoadduct 1

Into a four-necked flask equipped with stirrer, thermometer, dropping funnel, reflux condenser and nitrogen inlet tube 44.7 g of Desmodur T100 (TDI) (approx. 100% 2,4-toluene diisocyanate, NCO content=48.2) and 0.2 g of benzoyl chloride are introduced and thoroughly mixed, 22.5 g of MPEG 350 and 32.8 g of MPEG 500, which are anhydrous and alkaline free, are slowly metered in so that the temperature does not exceed 55° C. After the addition, the mixture is stirred at 55° C. for 3 hours. The excess TDI is removed from the reaction mixture by means of a thin film evaporator at 150° C. The residual TDI content is <1%.

Preparation of SR9020 Mono—Unsaturated Component (A)

Under an inert atmosphere, 200 g of SR9020 and 53.83 g of Monoadduct 1 are homogenized, 0.005 g of dibutyltin dilaurate and a mixture of stabilizers (Genorad 16 and MEHQ, 0.15% and 0.07% on total weight of the reaction mixture) are added and the mixture is heated to 80° C. The reaction mixture is stirred at this temperature for about 10 hours until a NCO content of 0% and an OH number of 0 mg KOH/g is reached.

Preparation of compounds having the general formula Y—(XH)$_n$

Y—XH

Intermediate A1

Polyester of n-decanol and epsilon-caprolactone (molar ratio 1:8.3)

Under an inert atmosphere, 144 g of n-decanol and 857 g of epsilon-caprolactone are homogenized, 0.02 parts of dibutyltin dilaurate is added and the mixture heated to 170° C. The reaction mixture is stirred at this temperature for about 6 hours until a solids content of 99% is reached. The product with a number-average molar mass $M_n$ of about 1100 g/mol is solid at room temperature and has an OH number of 51 mg KOH/g.

Intermediate A2

Polyester of isodecanol and epsilon-caprolactone (molar ratio 1:8.3)

Under an inert atmosphere, 144 g of isodecanol and 857 g of epsilon-caprolactone are homogenized, 0.04 parts of dibutyltin dilaurate is added and the mixture heated to 180° C. The reaction mixture is stirred at this temperature for about 4 hours until a solids content of 98% is reached. The product with a number-average molar mass $M_n$ of about 1100 g/mol is solid at room temperature and has an OH number of 51 mg KOH/g Intermediate A3

Polyester of MPEG 500 and epsilon-caprolactone (molar ratio 1:3.5)

Under an inert atmosphere, 58 g of MPEG 500 and 42 g of epsilon-caprolactone are homogenized, 0.3 parts of dodecylbenzenesulphonic acid is added and the mixture heated to 80° C. The reaction mixture is stirred at this temperature for about 2 hours until a solids content of 98% is reached. The product with a number-average molar mass $M_n$ of about 900 g/mol is liquid at room temperature and has an OH number of 62 mg KOH/g.

Intermediate A4

Polyester of monophenyl glycol and epsilon-caprolactone (molar ratio 1:5.8)

Under an inert atmosphere, 178 g of monophenyl glycol and 822 g of epsilon-caprolactone are homogenized, 0.04 parts of dibutyltin dilaurate is added and the mixture heated to 160° C. The reaction mixture is stirred at this temperature for about 7 hours until a solids content of 98% is reached. The product with a number-average molar mass $M_n$ of about 800 g/mol is solid at room temperature and has an OH number of 70 mg KOH/g.

Intermediate A5

Polyester of butoxypolypropylene glycol (having an average molar mass of about 700), epsilon-caprolactone and delta-valerolactone (molar ratio 1:10.5:10.5)

Under an inert atmosphere, 250 g of butoxypolypropylene glycol, 428 g of epsilon-caprolactone and 375 g of delta-valerolactone are homogenized, 0.04 parts of dibutyltin dilaurate is added and the mixture heated to 160° C. The reaction mixture is stirred at this temperature for about 11 hours until a solids content of 98% is reached. The product with a number-average molar mass $M_n$ of about 2950 g/mol has an OH number of 19 mg KOH/g.

Intermediate A6

Polyester of isodecanol and epsilon-caprolactone (molar ratio 1:5.2)

Under an inert atmosphere, 210 g of isodecanol and 790 g of epsilon-caprolactone are homogenized, 0.04 part of dibutyltin dilaurate is added and the mixture heated to 180° C. The reaction mixture is stirred at this temperature for about 4 hours until a solids content of 98% is reached. The product with a number-average molar mass $M_n$ of about 750 g/mol is solid at room temperature and has an OH number of 75 mg KOH/g.

Y—(XH)$_2$

Intermediate A7

Polyester of PEG 400 and epsilon-caprolactone (molar ratio 1:6.1)

Under an inert atmosphere, 9.0 g of PEG 400 and 15.6 g of epsilon-caprolactone are homogenized, 0.003 part of dibutyltin dilaurate is added and the mixture heated to 170° C. The reaction mixture is stirred at this temperature for about 7 hours until a solids content of 98% is reached. The product with a number-average molar mass $M_n$ of about 1100 g/mol is solid at room temperature and has an OH number of 102 mg KOH/g.

Intermediate A8

Polyester of 1,4-butanediol and epsilon-caprolactone (molar ratio 1:8.0)

Under an inert atmosphere, 9.0 g of 1,4-butanediol and 91 g of epsilon-caprolactone are homogenized, 0.003 part of dibutyltin dilaurate is added and the mixture heated to 160° C. The reaction mixture is stirred at this temperature for about 7 hours until a solids content of 98% is reached. The product with a number-average molar mass $M_n$ of about 1000 g/mol is solid at room temperature and has an OH number of 112 mg KOH/g.

Y—(XH)$_3$

Intermediate A9

Polyester of trimethylolpropane and epsilon-caprolactone (molar ratio 1:11.1)

Under an inert atmosphere, 9.6 g of trimethylolpropane and 90.5 g of epsilon-caprolactone are homogenized, 0.003 part of dibutyltin dilaurate is added and the mixture heated to 170° C. The reaction mixture is stirred at this temperature for about 7 hours until a solids content of 98% is reached. The product with a number-average molar mass $M_n$ of about 1400 g/mol is solid at room temperature and has an OH number of 120 mg KOH/g.

Synthesis of Final Products

General Manufacturing Procedure 1* (Not Inventive Examples)

xx g of Polyisocyanate P are homogenized with xx g of Y—XH and xx g of solvent. The mixture is heated to 70° C. under inert gas, and xx g of dibutyltin dilaurate is added. The mixture is stirred at this temperature until xx % of the NCO groups used have undergone reaction. Then xx g Z-Q and xx g of M-Q are added and stirring is continued at 80° C. until all of the NCO groups have been consumed by reaction.

General Manufacturing Procedure 2* (Not Inventive Examples)

xx g of Polyisocyanate P are homogenized with xx g of Y—XH and xx g of solvent. The mixture is heated to 70° C. under inert gas, and xx g of dibutyltin dilaurate is added. The mixture is stirred at this temperature until xx % of the NCO groups used have undergone reaction. Then xx g of Y—(XH)$_{2-3}$ are added. Stirring is continued at 70° C. until further xx % of the NCO groups used have undergone reaction. Then xx g Z-Q and xx g of M-Q are added and stirring is continued at 80° C. until all of the NCO groups have been consumed by reaction.

General Manufacturing Procedure 3A xx g of Polyisocyanate P are homogenized with xx g of Y—XH and xx g of solvent. The mixture is heated to 60° C. under inert gas, and xx g of dibutyltin dilaurate is added. The mixture is stirred at this temperature until xx % of the NCO groups used have undergone reaction. Then xx g Z-Q and xx g of M-Q is added and stirring is continued at 60° C. until all of the NCO groups have been consumed by reaction. The reaction mixture is cooled down to room temperature and xx g of the unsaturated component (A) is added to the reaction mixture together with a mixture of stabilizers (Genorad 16 and MEHQ, 0.15% and 0.07% on total weight of the final composition). The mixture is homogenized and heated to 60° C. then the pressure is reduced stepwise down to 28 mbar until the solvent is removed completely.

General Manufacturing Procedure 3B

To xx g of Polyisocyanate P xx g of the unsaturated component (A) is added together with a mixture of stabilizers (Genorad 16 and MEHQ, 0.15% and 0.07% on total weight of the final composition). The mixture is homogenized and heated to 60° C., then the pressure is reduced stepwise to 28 mbar and the solvent is distilled off. After complete removal of the solvent, the solution is cooled down to room temperature and homogenized with xx g of Y—XH. Then the mixture is heated to 70° C. under inert gas and xx g of dibutyltin dilaurate is added. The mixture is stirred at this temperature until xx % of the NCO groups used have undergone reaction. Then xx g of Z-Q and xx g of M-Q are added and stirring is continued at 80° C. until all of the NCO groups have been consumed by reaction.

General Manufacturing Procedure 3C xx g of Polyisocyanate P are homogenized with xx g of the unsaturated component (A), a mixture of stabilizers (Genorad 16 and MEHQ, 0.15% and 0.07% on total weight of the final composition) and with xx g of Y-XH. Then the mixture is heated to 70° C. under inert gas, and xx g of dibutyltin dilaurate is added. The mixture is stirred at this temperature until xx % of the NCO groups used have undergone reaction. Then xx g of Z-Q and xx g of M-Q are added and stirring is continued at 80° C. until all of the NCO groups have been consumed by reaction.

General Manufacturing Procedure 4A xx g of Polyisocyanate P are homogenized with xx g of Y—XH and xx g of solvent. The mixture is heated to 60° C. under inert gas, and xx g of dibutyltin dilaurate is added. The mixture is stirred at this temperature until xx % of the NCO groups used have undergone reaction. Then xx g of Y—(XH)$_{2-3}$ is added. Stirring is continued at 60° C. until further xx % of the NCO groups used have undergone reaction.

Then xx g Z-Q and xx g of M-Q are added and stirring is continued at 60° C. until all of the NCO groups have been consumed by reaction. The reaction mixture is cooled down to room temperature and xx g of the unsaturated component (A) is added to the reaction mixture together with a mixture of stabilizers (Genorad 16 and MEHQ, 0.15% and 0.07% on total weight of the final composition). The mixture is homogenized and heated to 60° C. then the pressure is reduced stepwise down to 28 mbar until the solvent is removed completely.

General Manufacturing Procedure 4B

To xx g of Polyisocyanate P xx g of the unsaturated component (A) is added together with a mixture of stabilizers (Genorad 16 and MEHQ, 0.15% and 0.07% on total weight of the final composition). The mixture is homogenized and heated to 60° C. then the pressure is reduced stepwise to 28 mbar and the solvent is distilled off. After complete removal of the solvent, the solution is cooled down to room temperature and homogenized with xx g of Y—XH. Then the mixture is heated to 70° C. under inert gas, and xx g of dibutyltin dilaurate is added. The mixture is stirred at this temperature until xx % of the NCO groups used have undergone reaction. Then xx g of Y—(XH)$_{2-3}$ are added and stirring is continued until further xx % of the NCO groups used have undergone reaction.

Then xx g of Z-Q and xx g of M-Q are added and stirring is continued at 80° C. until all of the NCO groups have been consumed by reaction.

General Manufacturing Procedure 4C xx g of Polyisocyanate P are homogenized with xx g of the unsaturated component (A), a mixture of stabilizers (Genorad 16 and MEHQ, 0.15% and 0.07% on total weight of the final composition) and with xx g of Y—XH. Then the mixture is heated to 70° C. under inert gas, and xx g of dibutyltin dilaurate is added. The mixture is stirred at this temperature until xx % of the NCO groups used have undergone reaction. Then xx g of Y—(XH)$_{2-3}$ are added and stirring is continued until further xx % of the NCO groups used have undergone reaction. Then xx g of Z-Q and xx g of M-Q are added and stirring is continued at 80° C. until all of the NCO groups have been consumed by reaction.

| Example | GMP | P (grams) | solvent (grams) | catalyst (grams) | Y-XH (grams) | % NCO reacted | Y-(XH)$_{2-3}$ (grams) | % NCO reacted | Z-Q (grams) | M-Q (grams) | Nitrogen content (%) | unsaturated component (A) (grams) | Ratio (weight) A:B |
|---|---|---|---|---|---|---|---|---|---|---|---|---|---|
| Example 1* | 1 | P1 (28.1) | BA (86.7) | DBTL (0.003) | A6 (26.2) | 65.0 | — | — | API (2.5) | — | 6.6% | — | — |
| Example 2* | 1 | P1 (28.1) | PMA (86.7) | DBTL (0.003) | A6 (26.2) | 65.0 | — | — | API (2.5) | — | 6.6% | — | — |
| Example 3 | 3A | P3 (28.1) | EA (86.7) | DBTL (0.003) | A6 (26.2) | 65.0 | — | — | API (2.5) | — | 6.6% | Butyl acrylate (100.45) | 70:30 |
| Example 4 | 3A | P3 (28.1) | EA (86.7) | DBTL (0.003) | A6 (26.2) | 65.0 | — | — | API (2.5) | — | 6.6% | HDDA (100.45) | 70:30 |
| Example 5 | 3A | P3 (28.1) | EA (86.7) | DBTL (0.003) | A6 (26.2) | 65.0 | — | — | API (2.5) | — | 6.6% | TPGDA (100.45) | 70:30 |
| Example 6 | 3A | P3 (28.1) | EA (86.7) | DBTL (0.003) | A6 (26.2) | 65.0 | — | — | API (2.5) | — | 6.6% | SR9020 (100.45) | 70:30 |
| Example 7 | 3A | P3 (28.1) | EA (86.7) | DBTL (0.003) | A6 (26.2) | 65.0 | — | — | API (2.5) | — | 6.6% | TMPTA (100.45) | 70:30 |

-continued

| Example | GMP | P (grams) | solvent (grams) | catalyst (grams) | Y-XH (grams) | % NCO reacted | Y-(XH)$_{2-3}$ (grams) | % NCO reacted | Z-Q (grams) | M-Q (grams) | Nitrogen content (%) | unsaturated component (A) (grams) | Ratio (weight) A:B |
|---|---|---|---|---|---|---|---|---|---|---|---|---|---|
| Example 8 | 3A | P3 (28.1) | EA (86.7) | DBTL (0.003) | A6 (26.2) | 65.0 | — | — | API (2.5) | — | 6.6% | Ebecryl160 (100.45) | 70:30 |
| Example 9 | 3A | P3 (28.1) | EA (86.7) | DBTL (0.003) | A6 (26.2) | 65.0 | — | — | API (2.5) | — | 6.6% | PETA (100.45) | 70:30 |
| Example 10 | 3A | P3 (28.1) | EA (35.4) | DBTL (0.002) | A1 (32.4) | 55.0 | — | — | DMAPA (2.5) | — | 5.7% | PETA (73.8) | 60:40 |
| Example 11 | 3A | P3 (28.1) | EA (33.2) | DBTL (0.002) | A2 (29.4) | 50.0 | — | — | DEEA (3.2) | — | 5.4% | PETA (47.00) | 50:50 |
| Example 12 | 3A | P3 (28.1) | EA (32.2) | DBTL (0.003) | A3 (28.9) | 60.0 | — | — | API (2.7) | — | 6.4% | PETA (68.9) | 60:40 |
| Example 13 | 3A | P3 (28.1) | EA (86.2) | DBTL (0.003) | A4 (25.7) | 60.0 | — | — | API (2.05) | TEA (0.80) | 6.5% | PETA (100.0) | 70:30 |
| Example 14 | 3A | P3 (28.1) | EA (167.2) | DBTL (0.004) | A5 (104.4) | 65.0 | — | — | DMAPA (1.95) | — | 2.3% | PETA (281.5) | 70:30 |
| Example 15 | 3A | P2 (50.0) | EA (163.8) | DBTL (0.002) | A6 (97.3) | 50.0 | — | — | API (16.5) | — | 7.4% | Butyl acrylate (163.8) | 50:50 |
| Example 16 | 3A | P3 (28.1) | EA (86.7) | DBTL (0.003) | A6 (26.2) | 65.0 | — | — | API (2.5) | — | 6.6% | Sartomer SR DFM (100.45) | 70:30 |
| Example 17 | 3A | P3 (28.1) | EA (86.7) | DBTL (0.003) | A6 (26.2) | 65.0 | — | — | API (2.5) | — | 6.6% | DAP (100.45) | 70:30 |
| Example 18 | 3A | P3 (28.1) | EA (86.7) | DBTL (0.003) | A6 (26.2) | 65.0 | — | — | API (2.5) | — | 6.6% | TEGDVE (100.45) | 70:30 |
| Example 19 | 3A | P3 (28.1) | EA (86.7) | DBTL (0.003) | A6 (26.2) | 65.0 | — | — | API (2.5) | — | 6.6% | DEGDVE (100.45) | 70:30 |
| Example 20* | 2 | P1 (15.7) | BA (39.9) | DBTL (0.001) | A6 (9.0) | 40.0 | PEG600PR (1.9) | 62.0 | API (1.5) | — | 9.6% | — | — |
| Example 21* | 2 | P1 (15.7) | PMA (39.9) | DBTL (0.001) | A6 (9.0) | 40.0 | PEG600PR (1.9) | 62.0 | API (1.5) | — | 9.6% | — | — |
| Example 22 | 4A | P3 (15.7) | EA (39.9) | DBTL (0.001) | A6 (9.0) | 40.0 | PEG600PR (1.9) | 62.0 | API (1.5) | — | 9.6% | HDDA (47.6) | 70:30 |
| Example 23 | 4A | P3 (15.7) | EA (39.9) | DBTL (0.001) | A6 (9.0) | 40.0 | PEG600PR (1.9) | 62.0 | API (1.5) | — | 9.6% | TPGDA (47.6) | 70:30 |
| Example 24 | 4A | P3 (15.7) | EA (39.9) | DBTL (0.001) | A6 (9.0) | 40.0 | PEG600PR (1.9) | 62.0 | API (1.5) | — | 9.6% | DPGDA (47.6) | 70:30 |
| Example 25 | 4A | P3 (15.7) | EA (39.9) | DBTL (0.001) | A6 (9.0) | 40.0 | PEG600PR (1.9) | 62.0 | API (1.5) | — | 9.6% | SR9020 (47.6) | 70:30 |
| Example 26 | 4A | P3 (15.7) | EA (39.9) | DBTL (0.001) | A6 (9.0) | 40.0 | PEG600PR (1.9) | 62.0 | API (1.5) | — | 9.6% | TMPTA (47.6) | 70:30 |
| Example 27 | 4A | P3 (15.7) | EA (39.9) | DBTL (0.001) | A6 (9.0) | 40.0 | PEG600PR (1.9) | 62.0 | API (1.5) | — | 9.6% | Ebecryl160 (47.6) | 70:30 |
| Example 28 | 4A | P3 (15.7) | EA (39.9) | DBTL (0.001) | A6 (9.0) | 40.0 | PEG600PR (1.9) | 62.0 | API (1.5) | — | 9.6% | PETA (47.6) | 70:30 |
| Example 29 | 4A | P2 (50.0) | EA (190.3) | DBTL (0.002) | A6 (97.3) | 50.0 | A7 (35.7) | 75.0 | DMAPA (5.4) | TEA (1.9) | 8.8% | Butyl acrylate (190.3) | 50:50 |
| Example 30 | 4A | P2 (25.0) | EA (94.5) | DBTL (0.002) | A6 (58.4) | 60.0 | PEG600PR (7.8) | 80.0 | API (3.3) | — | 5.1% | HDDA (141.75) | 60:40 |
| Example 31 | 4A | P3 (20.0) | EA (33.2) | DBTL (0.001) | A6 (12.85) | 45.0 | A7 (4.2) | 65.0 | DMAP (1.4) | — | 8.1% | PETA (66.85) | 70:30 |
| Example 32 | 4A | P3 (20.0) | EA (31.15) | DBTL (0.001) | A6 (12.85) | 45.0 | A8 (2-9) | 60.0 | DMAE (1.35) | — | 6.3% | PETA (63.7) | 70:30 |
| Example 33 | 4A | P3 (20.0) | EA (33.85) | DBTL (0.001) | A6 (15.7) | 55.0 | A9 (1-8) | 65.0 | DMAPA (1.4) | — | 6.5% | PETA (67.9) | 70:30 |
| Example 34 | 4A | P3 (15.7) | EA (39.9) | DBTL (0.001) | A6 (9.0) | 40.0 | PEG600PR (1.9) | 62.0 | API (1.5) | — | 7.9% | Sartomer SR DFM (47.6) | 70:30 |
| Example 35 | 4A | P3 (15.7) | EA (39.9) | DBTL (0.001) | A6 (9.0) | 40.0 | PEG600PR (1.9) | 62.0 | API (1.5) | — | 7.9% | DAP (47.6) | 70:30 |
| Example 36 | 4A | P3 (15.7) | EA (39.9) | DBTL (0.001) | A6 (9.0) | 40.0 | PEG600PR (1.9) | 62.0 | API (1.5) | — | 7.9% | TEGDVE (47.6) | 70:30 |
| Example 37 | 4A | P3 (15.7) | EA (39.9) | DBTL (0.001) | A6 (9.0) | 40.0 | PEG600PR (1.9) | 62.0 | API (1.5) | — | 7.9% | DEGDVE (47.6) | 70:30 |
| Example 38* | 1 | P1 (28.1) | BA (85.5) | DBTL (0.003) | A6 (26.2) | 65.0 | — | — | DMAP (2.0) | — | 5.7% | — | — |
| Example 39 | 3B | P3 (28.1) | — | DBTL (0.003) | A6 (26.2) | 65.0 | — | — | DMAP (2.0) | — | 5.7% | Butyl acrylate (100.5) | 70:30 |
| Example 40 | 3B | P3 (28.1) | — | DBTL (0.003) | A6 (26.2) | 65.0 | — | — | DMAP (2.0) | — | 5.7% | TMPTA (100.5) | 70:30 |
| Example 41 | 3B | P3 (28.1) | — | DBTL (0.003) | A6 (26.2) | 65.0 | — | — | DMAP (2.0) | — | 5.7% | SR9020 Mono (169.65) | 80:20 |

-continued

| Example | GMP | P (grams) | solvent (grams) | catalyst (grams) | Y-XH (grams) | % NCO reacted | Y-(XH)$_{2-3}$ (grams) | % NCO reacted | Z-Q (grams) | M-Q (grams) | Nitrogen content (%) | unsaturated component (A) (grams) | Ratio (weight) A:B |
|---|---|---|---|---|---|---|---|---|---|---|---|---|---|
| Example 42 | 3C | P2 (25.0) | — | DBTL (0.003) | A6 (58.4) | 60.0 | — | — | DEEA (6.2) | — | 5.0% | Butyl acrylate (209.0) | 70:30 |
| Example 43 | 3C | P2 (20.0) | — | DBTL (0.003) | A3 (51.4) | 55.0 | — | — | DMAP (4.8) | — | 4.8% | HDDA (177.8) | 70:30 |
| Example 44* | 1 | P1 (15.7) | BA (39.3) | DBTL (0.001) | A6 (9.0) | 40.0 | PEG600PR (1.9) | 62.0 | DMAP (1.22) | — | 6.7% | — | — |
| Example 45 | 4B | P3 (15.7) | — | DBTL (0.003) | A6 (9.0) | 40.0 | PEG600PR (1.9) | 62.0 | DMAP (1.22) | — | 6.7% | Butyl acrylate (47.6) | 70:30 |
| Example 46 | 4B | P3 (15.7) | — | DBTL (0.003) | A6 (9.0) | 40.0 | PEG600PR (1.9) | 62.0 | DMAP (1.22) | — | 6.7% | Isooctyl acrylate (47.6) | 70:30 |
| Example 47 | 4B | P3 (15.7) | — | DBTL (0.003) | A6 (9.0) | 40.0 | PEG600PR (1.9) | 62.0 | DMAP (1.22) | — | 6.7% | HDDA (47.6) | 70:30 |
| Example 48 | 4B | P3 (15.7) | — | DBTL (0.003) | A6 (9.0) | 40.0 | PEG600PR (1.9) | 62.0 | DMAP (1.22) | — | 6.7% | TMPTA (47.6) | 70:30 |
| Example 49 | 4C | P2 (25.0) | — | DBTL (0.002) | A1 (57.1) | 40.0 | PEG 1000 (16.2) | 65.0 | DEEA (5.4) | — | 4.3% | Butyl acrylate (242.0) | 70:30 |
| Example 50 | 4C | P2 (20.0) | — | DBTL (0.002) | A3 (28.0) | 30.0 | A8 (15.6) | 60.0 | DMAP (4.3) | — | 5.3% | HDDA (158.0) | 70:30 |
| Example 51 | 3A | P3 (28.1) | EA (35.4) | DBTL (0.002) | BP1100 (32.4) | 55.0 | — | — | DMAPA (2.5) | — | 5.7% | PETA (73.8) | 60:40 |
| Example 52 | 3A | P3 (28.1) | EA (86.7) | DBTL (0.003) | A6 (26.2) | 65.0 | — | — | API (2.5) | — | 6.6% | BDDMA (100.45) | 70:30 |
| Example 53 | 3A | P3 (28.1) | EA (86.7) | DBTL (0.003) | A6 (26.2) | 65.0 | — | — | API (2.5) | — | 6.6% | TMPTMA (100.45) | 70:30 |
| Example 54 | 4A | P3 (15.7) | EA (39.9) | DBTL (0.001) | A6 (9.0) | 40.0 | PEG600PR (1.9) | 62.0 | API (1.5) | — | 7.9% | BDDMA (47.6) | 70:30 |
| Example 55 | 4A | P3 (15.7) | EA (39.9) | DBTL (0.001) | A6 (9.0) | 40.0 | PEG600PR (1.9) | 62.0 | API (1.5) | — | 7.9% | TMPTMA (47.6) | 70:30 |

Key:
P = polyisocyanate
*= not inventive examples
GMP = General Manufacturing Procedure
P1 = aromatic TDI polyisocyanurate having a free NCO content of 8.0% as a 51% strength solution in butyl acetate, e.g. Desmodur ® IL, Bayer AG
P2 = aliphatic polyisocyanate (HDI trimer) having a free NCO content of 21.8%, e.g. Desmodur ® N3300, Bayer AG
P3 = aromatic TDI polyisocyanurate having a free NCO content of 8.0%; as a 51% strength solution in ethyl acetate, e.g. Desmodur ® IL EA, Bayer AG
BA = butyl acetate
EA = ethyl acetate
PMA = 1-methoxy-2-propylacetate
DBTL = dibutyltin dilaurate
PEG600PR = Polyglykol PR 600 (dihydroxy-functional), purchased from Clariant AG, average molecular weight Mn = 600
PEG1000 = polyethylene glycol (dihydroxy-functional), average molecular weight Mn = 1000
API = 3-aminopropyl imidazole
DMAPA = N,N-dimethyl-3-aminopropylamine
DEEA = N,N-diethylaminoethanol
DMAP = N,N-dimethylaminopropanol
DMAE = N,N-dimethylaminoethanol
TEA = triethanol amine
HDDA = 1,6-hexanediol diacrylate
TPGDA = tripropylene glycol diacrylate
SR9020 = 3-mole propoxylated glyceryl triacrylate
TMPTA = trimethylolpropane triacrylate
Ebecryl160 = propylidynetrimethanol, ethoxylated, esters with acrylic acid (<6.5 EO), purchased from Arkema
PETA = pentaerythritol triacrylate
Sartomer SR DFM = trimethylpropane diallyl ether monomethacrylate
DPGDA = dipropylene glycol diacrylate
SR9020 Mono = monoadduct 1 modified 3-mole propoxylated glyceryl triacrylate
BP1100 = monohydroxy-functional PO polyether, prepared starting from butanol, average molecular weight Mn = 1100
BDDMA = 1,4-butanediol dimethacrylate
TMPTMA = trimethylolpropane trimethacrylate
TEGDVE = triethyleneglycol divinyl ether
DEGDVE = diethyleneglycol divinyl ether
DAP = diallyl phthalate Application Testing
Used Raw Materials:

| | |
|---|---|
| Ebecryl 81 | Allnex, UV/EB Curable Resins, amine modified polyester acrylate. |
| Ebecryl 450 | Allnex, UV/EB Curable Resins, fatty acid modified polyester hexaacrylate. |
| BYK-085 | BYK Chemie GmbH, Solvent-free, silicone-containing leveling additive with good defoaming properties for solvent-borne and solvent-free coatings and adhesives. |
| BYK-377 | BYK Chemie GmbH, Silicone surface additive for solvent-free, radiation curable, and solvent-borne coatings, adhesives, and printing inks with a strong reduction of surface tension. |
| Irgacure 907 | BASF, photoinitiator which is used to initiate the photo-polymerisation of chemically unsaturated prepolymers |

Pigments: P.R.57:1—Irgalite Rubine D4230 (L4 BH)
P.B.15:4—Fastogen Blue 249-5452
Preparation of the Pigment Dispersions (Millbases):
According to the formulation below, millbases with 15% of component (B) solid on pigment are prepared.
Formulation Millbase:

| | W&D additive 30% content of component (B) | W&D additive 20% content of component (B) |
|---|---|---|
| Ebecryl 81 | 60.54 | 56.21 |
| Ebecryl 450 | 9.36 | 8.69 |
| W&D additive | 10.0 | 15.0 |
| BYK-085 | 0.1 | 0.1 |
| Pigment | 20.0 | 20.0 |
| | 100.0 | 100.0 |

All the components from the table above are added in the same order as in the table into a temperature controlled grinding vessel. After addition of each component the mixture is homogenized with a spatula. The dispersion is done with a vertical beadmill using a teflon disk, 4.5 cm Ø (Dispermat CV, Getzmann GmbH) with the following parameters:

Grinding Conditions:

| | |
|---|---|
| Grinding time: | 30 min |
| Speed: | 10000 rpm |
| Grinding media: | Glass beads (1.0-1.3 mm Ø), removed after dispersion by filter (Glass beads: pigment concentrate 1.5:1 by weight), |
| Temperature: | 40° C. |

Let down Solution:

| | |
|---|---|
| Ebecryl 81 | 89.8 g |
| BYK-377 | 0.2 g |
| Irgacure 907 | 10.0 g |

All components are weighed into a glass vessel and homogenized with a spatula. Afterwards the vessel is covered with an aluminum foil to protect the mixture from light. The vessel is placed in an oven for 3 hours at 50° C. until all components are dissolved, after cooling down to room temperature the let down solution is ready to be used.

Let Down: 6 g Millbase: 4 g Let Down Solution

First the Let down solution is put into the Speedmixer cup and then the Millbase is added on the top. Then the samples are mixed for 30 seconds at 2000 rpm with the Speedmixer (DAC 150.1 FVZ, Hauschild Engineering). Afterwards a draw down with a 6 µm wired bar onto morest chart and PET-Film is done to check the colour strength/transparency. UV curing (80 W/cm/3 passes) is done with AKTIPRINT Dryer (Omnilab). After curing the colour strength/transparency is judged visually and the gloss (20/60°) is measured with a MICRO TRI GLOSS (BYK Gardner).

Results:
Example 20* and Example 21* are comparative not inventive examples to the inventive Examples 22-28,
Example 44* is the comparative not inventive example to the inventive Examples 45-48,
Example 1* and Example 2* are comparative not inventive examples to the inventive Examples 3-9 and Example 38* is the comparative not inventive example to the inventive Examples 39-41.

| | Irgalite Rubine D4230 (L4 BH) (P.R.57:1) | | | Fastogen Blue 249-5452 (P.B.15:4) | | |
|---|---|---|---|---|---|---|
| Product | Gloss 20°/60° | colour strength/ transparency | Product | Gloss 20°/60° | colour strength/ transparency | |
| Example 20* | 71/86 | 3 | Example 20* | 67/82 | 3 | |
| Example 21* | 71/87 | 3 | Example 21* | 67/83 | 3 | |
| Example 22 | 77/91 | 2 | Example 22 | 70/83 | 2 | |
| Example 23 | 76/92 | 2 | Example 23 | 69/83 | 2-3 | |
| Example 24 | 78/92 | 1-2 | Example 24 | 69/83 | 3 | |
| Example 25 | 74/91 | 2 | Example 25 | 70/83 | 3 | |
| Example 26 | 71/90 | 2-3 | Example 26 | 70/83 | 2 | |
| Example 27 | 73/91 | 2-3 | Example 27 | 71/83 | 2 | |
| Example 28 | 76/91 | 1-2 | Example 28 | 71/84 | 2 | |
| Example 44* | 72/88 | 2-3 | Example 44* | 68/82 | 3-4 | |
| Example 45 | 73/88 | 2 | Example 45 | 69/83 | 3 | |
| Example 46 | 73/90 | 2 | Example 46 | 70/83 | 3 | |
| Example 47 | 73/90 | 2-3 | Example 47 | 69/83 | 3 | |
| Example 48 | 75/89 | 2 | Example 48 | 70/84 | 2 | |
| Example 1* | 68/88 | 3 | Example 1* | 69/84 | 3-4 | |
| Example 2* | 70/88 | 3 | Example 2* | 69/83 | 3-4 | |
| Example 3 | 73/88 | 3 | Example 3 | 70/84 | 3 | |
| Example 4 | 75/91 | 2-3 | Example 4 | 70/84 | 3 | |
| Example 5 | 74/92 | 3 | Example 5 | 70/84 | 3 | |
| Example 6 | 74/90 | 2 | Example 6 | 70/84 | 3 | |
| Example 7 | 74/91 | 2 | Example 7 | 71/84 | 3 | |

-continued

| Irgalite Rubine D4230 (L4 BH) (P.R.57:1) | | | Fastogen Blue 249-5452 (P.B.15:4) | | |
|---|---|---|---|---|---|
| Product | Gloss 20°/60° | colour strength/ transparency | Product | Gloss 20°/60° | colour strength/ transparency |
| Example 8 | 73/90 | 3 | Example 8 | 70/84 | 3 |
| Example 9 | 71/92 | 2 | Example 9 | 71/84 | 2 |
| Example 38* | 74/88 | 2-3 | Example 38* | 69/82 | 3 |
| Example 39 | 76/91 | 2 | Example 39 | 70/82 | 2-3 |
| Example 40 | 76/91 | 2 | Example 40 | 72/84 | 3 |
| Example 41 | 73/90 | 2-3 | Example 41 | 71/84 | 2 |

*not inventive example
1 = good; 5 = bad

Flexo printing, like letterpress printing, is one of the relief printing processes and is used for printing newspapers, books and packaging, particularly for high-quality food packaging. Color strength/transparency is for the application in Flexographic printing inks of great importance. In general different pigmented inks are applied in several layers and inks of low transparency would hide the color of the layers applied before and would have a negative impact on the coloristic quality of the printed image.

The application results show that component (B) shows in combination with component (A) a synergistic effect. Color strength/transparency as well as gloss can be improved in comparison to the samples prepared with component (B) in solvent as wetting & dispersing additive. Especially samples prepared with component (A) having 2-3 unsaturated groups showed the best results of the tested samples.

The measurement of Gloss values is an established method to evaluate the quality of a pigment dispersion, higher Gloss values indicate a better dispersion and stabilization of the pigments.

The invention claimed is:

1. A composition comprising:
   i) 10-90 wt. % of an ethylenically unsaturated component (A),
   ii) 10-90 wt. % of a component (B) comprising urethane and/or urea groups,
   iii) 0-4 wt. % of an organic component (C) which is different from components (A) and (B), and
   iv) 0-9 wt. % of other ingredients (D),
   wherein the weight percentages are calculated based on the total weight of the composition,
   wherein the sum of the wt. % of component (A) and the wt. % of component (B) is 91-100 wt. %,
   component (A) comprises at least one compound including 1-8 ethylenically unsaturated bonds and a molar mass of 100-1400 g/mol, and component (A) contains no amino groups,
   component (B) contains no primary and no secondary amino groups, component (B) comprises at least one compound including 2-10 functional groups selected from urethane and urea groups, and including 1-40 groups selected from tertiary amino groups and salts thereof, quaternary ammonium groups, and mixtures thereof, component (B) contains not more tertiary amino groups than the sum of urethane and urea groups, and has a nitrogen content in the range of 1.0 to 12.0 wt. %,
   component (C) comprises at least one organic compound having a molar mass of less than 1000 g/mol.

2. The composition according to claim 1 comprising
   i) 25-75 wt. % of component (A),
   ii) 25-75 wt. % of component (B),
   iii) 0-2 wt. % of component (C), and
   iv) 0-2 wt. % of other ingredients (D),
   wherein the sum of the wt. % of component (A) and the wt. % of component (B) is 98-100 wt. %.

3. The composition according to claim 1 wherein at least 70 wt. % of component (A) is selected from species comprising (meth)acryl groups.

4. The composition according to claim 1, wherein at least 70 wt. % of component (A) comprises species including 2-4 ethylenically unsaturated bonds.

5. The composition according to claim 1, wherein at least 70 wt. % of component (A) is selected from species having a proportion of carbon atoms to ethylenically unsaturated bonds of from 12:1 to 3:1.

6. The composition according to claim 1, wherein component (B) has a molecular weight distribution and has a number-average molecular weight $M_n$ in the range of 2000-200000 g/mol.

7. The composition according to claim 1, wherein component (B) has a nitrogen content in the range of 4-9 wt. %.

8. The composition according to claim 1, wherein component B has an iodine value in the range of 0.0 to 10.0.

9. The composition according to claim 1, wherein at least 90 wt. % of component (B) comprises one or more adducts which are obtained by reacting
   one or more polyisocyanates (a) having at least two isocyanate groups per molecule with
   one or more compounds (b) of the formula (I)

$$Y-(XH)_n \qquad (I)$$

where
XH is a group that is reactive towards isocyanates, and
Y is a monomeric or polymeric group that is not reactive towards isocyanates, the monomeric or polymeric group contains no tertiary amino groups and no hydrolysable silane groups, and the monomeric or polymeric group comprises one or more aliphatic, cycloaliphatic and/or aromatic groups,
and where
the one or more compounds (b) of the formula (I) possess a number-average molar mass $M_n$ of 32 to 15000 g/mol and do not fall within the definition of component (c1) or component (c2),
and
n is 1, 2 or 3,
where n is 1 for at least 50 mol. % of the one or more compounds (b) of the formula (I), with the proviso that 20% to 90% of the isocyanate groups of the one or more polyisocyanates (a) are reacted with the one or more compounds of the formula (I), and one or more compounds (c1) of the general formula (IIa)

Z-Q　　(IIa)

in which Q is —NH$_2$, —NHR or OH, in which R is a linear or branched organic group having 1 to 18 carbon atoms, and Z is an organic group comprising at least one tertiary amino group and containing no isocyanate-reactive groups, and optionally one or more compounds (c2) different from the one or more compounds (c1), the one or more compounds (c2) being of the general formula (IIb)

M-Q　　(IIb)

in which Q is —NH$_2$, —NHR or OH, in which R is a linear or branched organic group having 1 to 18 carbon atoms, and M is an organic group having a number-average molar mass of not more than 1000 g/mol and comprising at least one tertiary amino group and at least one hydroxyl group, with the proviso that at least 10% of the isocyanate groups of the one or more polyisocyanates (a) are reacted with component (c1).

10. The composition according to claim 9, wherein for at least 70 wt. % of the component (B), Z comprises one or more of j) an aliphatic and/or cycloaliphatic group comprising at least one tertiary amino group, or k) a heterocyclic group comprising at least one basic ring nitrogen atom that does not contain a hydrogen atom, the heterocyclic group optionally being attached to the group Q via an organic coupling group.

11. The composition according to claim 9, wherein for at least 70 wt. % of the component (B), mono-functional species of the formula (I) are selected from monohydroxy-functional polyethers, polyesters, polyether-polyesters, aliphatic and/or cycloaliphatic monoalcohols having 2 to 30 carbon atoms, and mixtures thereof.

12. The composition according to claim 9, wherein for at least 70 wt. % of the component (B), the one or more polyisocyanates (a) are products containing one or more isocyanurate groups, of diisocyanates based on hexamethylene diisocyanate, diisophorone diisocyanate and/or tolylene diisocyanate.

13. The composition according to claim 1, wherein the composition is a liquid at a temperature of 23° C.

14. The composition according to claim 1, wherein the composition has an amine value in the range of 2-50 mg KOH/g.

15. The composition according to claim 1 containing no primary and no secondary amines.

16. The composition according to claim 1 containing no free radical initiator.

17. A coating composition comprising solid particles and the composition according to claim 1.

18. The composition according to claim 1, wherein:

component (A) consists of compounds having 1-8 ethylenically unsaturated bonds and a molar mass of 100-1400 g/mol, and component (A) contains no amino groups;

component (B) contains no primary and no secondary amino groups, component (B) consists of compound having 2-10 functional groups selected from urethane and urea groups, having 1-40 groups selected from tertiary amino groups and salts thereof, quaternary ammonium groups, and mixtures thereof, component (B) contains not more tertiary amino groups than the sum of urethane and urea groups, and component (B) has a nitrogen content in the range of 1.0 to 12.0 wt. %; and component (C) consists of organic compounds having a molar mass of less than 1000 g/mol.

19. The composition according to claim 1, wherein at least 70 wt. % of component (A) comprises species including 2-3 ethylenically unsaturated bonds.

20. An ink comprising solid particles and the composition according to claim 1.

21. A polymer system comprising solid particles and the composition according to claim 1.

* * * * *